(12) United States Patent
Suzuki et al.

(10) Patent No.: US 12,630,127 B2
(45) Date of Patent: May 19, 2026

(54) ELECTRIC BRAKE DEVICE

(71) Applicant: Hitachi Astemo, Ltd., Ibaraki (JP)

(72) Inventors: Sota Suzuki, Hitachinaka (JP); Tatsuro Kobune, Hitachinaka (JP); Wataru Yokoyama, Hitachinaka (JP); Kenichiro Matsubara, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 713 days.

(21) Appl. No.: 17/417,476

(22) PCT Filed: Dec. 18, 2019

(86) PCT No.: PCT/JP2019/049568
§ 371 (c)(1),
(2) Date: Jun. 23, 2021

(87) PCT Pub. No.: WO2020/137734
PCT Pub. Date: Jul. 2, 2020

(65) Prior Publication Data
US 2022/0073038 A1 Mar. 10, 2022

(30) Foreign Application Priority Data
Dec. 26, 2018 (JP) ................................. 2018-242708

(51) Int. Cl.
*B60T 8/17* (2006.01)
*B60T 13/74* (2006.01)
(Continued)

(52) U.S. Cl.
CPC .............. *B60T 8/17* (2013.01); *B60T 13/746* (2013.01); *B60T 17/22* (2013.01); *F16D 65/18* (2013.01);
(Continued)

(58) Field of Classification Search
CPC ........... B60T 8/17; B60T 13/746; B60T 17/22
See application file for complete search history.

(56) References Cited

U.S. PATENT DOCUMENTS

2010/0010719 A1 1/2010 Bauer et al.
2010/0072811 A1 3/2010 Kondo et al.
(Continued)

FOREIGN PATENT DOCUMENTS

| | | |
|---|---|---|
| JP | 2010-500511 | 1/2010 |
| JP | 2010-76479 | 4/2010 |
| JP | 2016-124403 | 7/2016 |

OTHER PUBLICATIONS

Office Action issued Dec. 6, 2022 in corresponding Korean Patent Application No. 10-2021-7013850, with English translation.
(Continued)

*Primary Examiner* — Imran K Mustafa
(74) *Attorney, Agent, or Firm* — Wenderoth, Lind & Ponack, L.L.P.

(57) ABSTRACT

An electric brake mechanism includes a piston (6D) propelled by a rotation-linear motion mechanism (8) driven by an electric motor (7A). The piston (6D) is configured to press brake pads (6C) against a disc rotor (4), and to hold the brake pads (6C) at a pressing position by stopping the electric motor (7A). A parking brake control device (24) is configured to determine, when a request (application command) to hold the brake pads (6C) is made, a judgment timing for judging whether to stop the electric motor (7A) based on a change trend of a current value of the electric motor (7A). When the judgment timing is reached, the parking brake control device (24) judges whether or not to stop the electric motor (7A).

6 Claims, 11 Drawing Sheets

(51) Int. Cl.
  *B60T 17/22*         (2006.01)
  *F16D 55/226*        (2006.01)
  *F16D 65/18*         (2006.01)
  *F16D 121/24*        (2012.01)
  *F16D 125/40*        (2012.01)
  *H02P 3/04*          (2006.01)

(52) U.S. Cl.
  CPC .............. *H02P 3/04* (2013.01); *F16D 55/226*
       (2013.01); *F16D 2121/24* (2013.01); *F16D*
                              *2125/40* (2013.01)

(56)                    References Cited

U.S. PATENT DOCUMENTS

2016/0339888 A1* 11/2016 Yokoyama .............. F16D 65/18
2017/0355356 A1* 12/2017 Okada ....................... B60T 7/06
2021/0380089 A1* 12/2021 Dossi ..................... B60T 7/107

OTHER PUBLICATIONS

International Search Report issued Feb. 4, 2020 in corresponding International Application No. PCT/JP2019/049568, with English Translation.
Written Opinion of the International Searching Authority issued Feb. 4, 2020 in International Application No. PCT/JP2019/049568, with English Translation.

* cited by examiner

CURRENT VALUE I

CURRENT DIFFERENTIAL VALUE i i max i min tc

TIME

CURRENT/CURRENT DIFFERENTIAL VALUE

ELECTRIC BRAKE DEVICE

TECHNICAL FIELD

The present invention relates to an electric brake device configured to apply a braking force to a vehicle, for example, an automobile.

BACKGROUND ART

As an electric brake device arranged in a vehicle, for example, an automobile, there is known an electric brake device configured to apply a braking force when the vehicle is stopped or parked, for example, based on drive (rotation) of an electric motor (Patent Literature 1). In Patent Literature 1, there is described a brake device configured to judge, when an electric motor is driven in an application direction (braking application direction), that application is complete when a current value is equal to or more than a threshold value for a predetermined period of time, and to stop the electric motor.

CITATION LIST

Patent Literature

PTL 1: JP 2016-124403 A

SUMMARY OF INVENTION

Technical Problem

In the case of the related art, there is a possibility that variation in the current value at the time when application is complete (hereinafter also referred to as "arrival current") is not suppressible while maintaining robustness against false detection of application completion due to current fluctuation. That is, it is difficult to suppress both false detection of application completion and variation in thrust at the time when application is complete despite current fluctuations during application.

Solution to Problem

It is an object of the present invention to provide an electric brake device capable of suppressing variation in an arrival current (that is, thrust) while ensuring robustness against current fluctuation.

According to one embodiment of the present invention, there is provided an electric brake device including: an electric brake mechanism in which a piston propelled by a rotation-linear motion mechanism driven by an electric motor is configured to press a braking member against a braked member, and to hold the braking member at a pressing position by stopping the electric motor; and a control unit configured to control the electric motor, wherein the control unit is configured to determine, when a request to hold the braking member is made, a judgment timing for judging whether to stop the electric motor based on a change trend of a current value of the electric motor, and to judge, when the judgment timing is reached, whether to stop the electric motor.

Further, according to one embodiment of the present invention, there is provided an electric brake device including: an electric brake mechanism in which a piston propelled by a rotation-linear motion mechanism driven by an electric motor is configured to press a braking member against a braked member, and to hold the braking member at a pressing position by stopping the electric motor; and a control unit configured to control the electric motor, wherein the control unit is configured to determine, when a request to hold the braking member is made, a judgment timing for judging whether a rotational position of the electric motor has arrived at a position at which holding of the braking member is complete based on a change trend of a current value of the electric motor, and to judge, when the judgment timing is reached, whether the holding of the braking member is complete.

According to the electric brake device of one embodiment of the present invention, it is possible to suppress the variation in the arrival current (that is, thrust) while ensuring the robustness against the current fluctuation.

BRIEF DESCRIPTION OF DRAWINGS

FIG. 9 is a characteristic curve diagram for showing an example of a current change and a current differential value change over time in the third embodiment.

DESCRIPTION OF EMBODIMENTS

There is now described with reference to the accompanying drawings an example of a case in which an electric brake device according to embodiments of the present invention is mounted on a four-wheeled automobile. In the flowcharts illustrated in FIG. 4, FIG. 6, FIG. 8, and FIG. 10, each step is indicated by using the notation "S" (for example, Step 1="S1").

Figure 1:
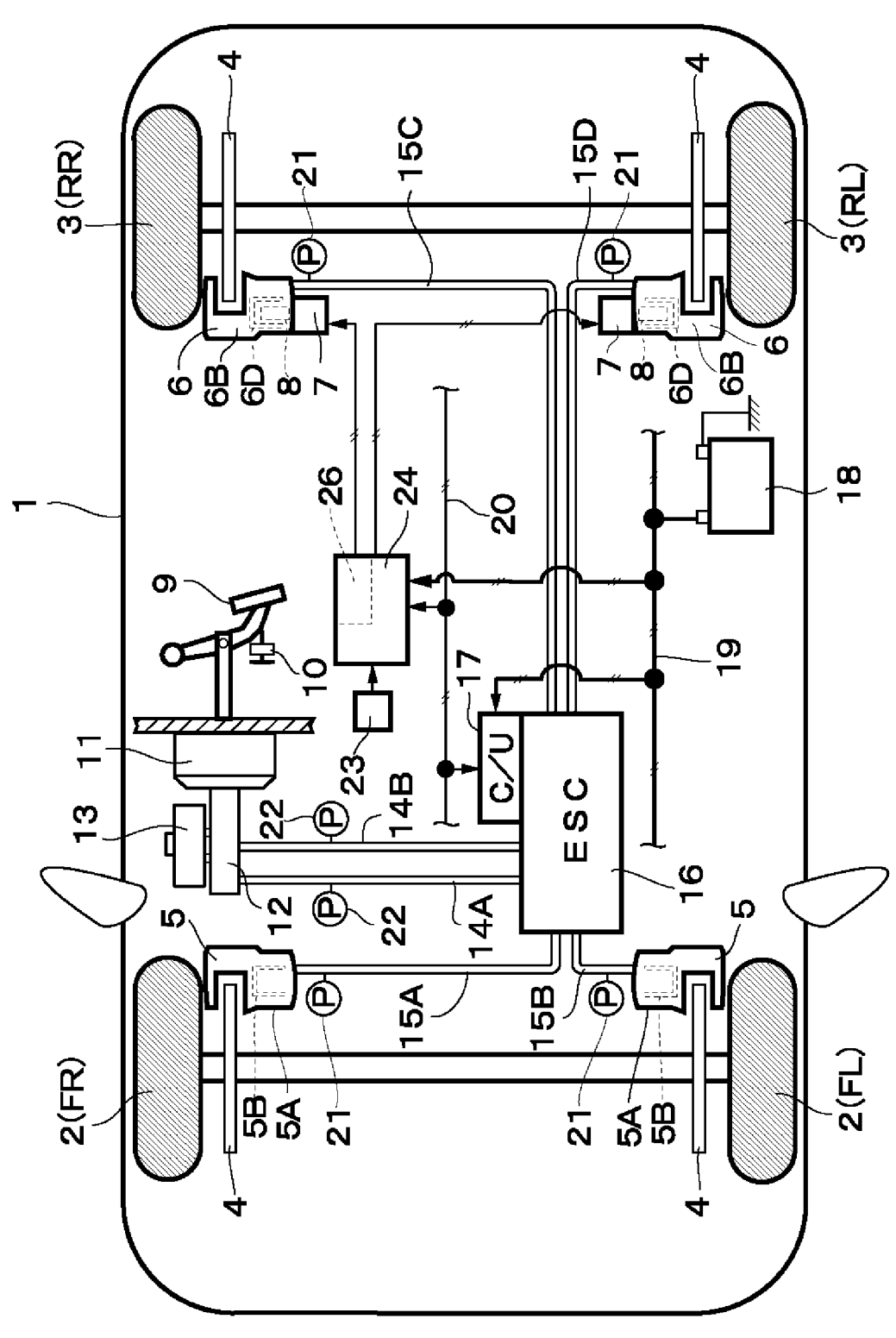
FIG. 1 is a conceptual diagram of a vehicle having mounted thereon an electric brake device according to a first embodiment of the present invention.

FIG. 1 to FIG. 5 are diagrams for illustrating a first embodiment of the present invention. In FIG. 1, a total of four wheels including, for example, left and right front wheels 2 (FL, FR) and left and right rear wheels 3 (RL, RR) are arranged on a lower side (road surface side) of a vehicle body 1 forming a body of the vehicle. The wheels (each of the front wheels 2 and rear wheels 3) form the vehicle together with the vehicle body 1. The vehicle is equipped with a braking system for applying a braking force. The vehicle braking system is now described.

A disc rotor 4 is arranged on each of the front wheels 2 and the rear wheels 3 as a braked member (rotating member) configured to rotate together with each wheel (each front wheel 2 and each rear wheel 3). A braking force is applied to the disc rotor 4 for each front wheel 2 by a front-wheel disc brake 5, which is a hydraulic disc brake. A braking force is applied to the disc rotor 4 for each rear wheel 3 by a rear-wheel disc brake 6, which is a hydraulic disc brake having an electric parking brake function.

Figure 2:
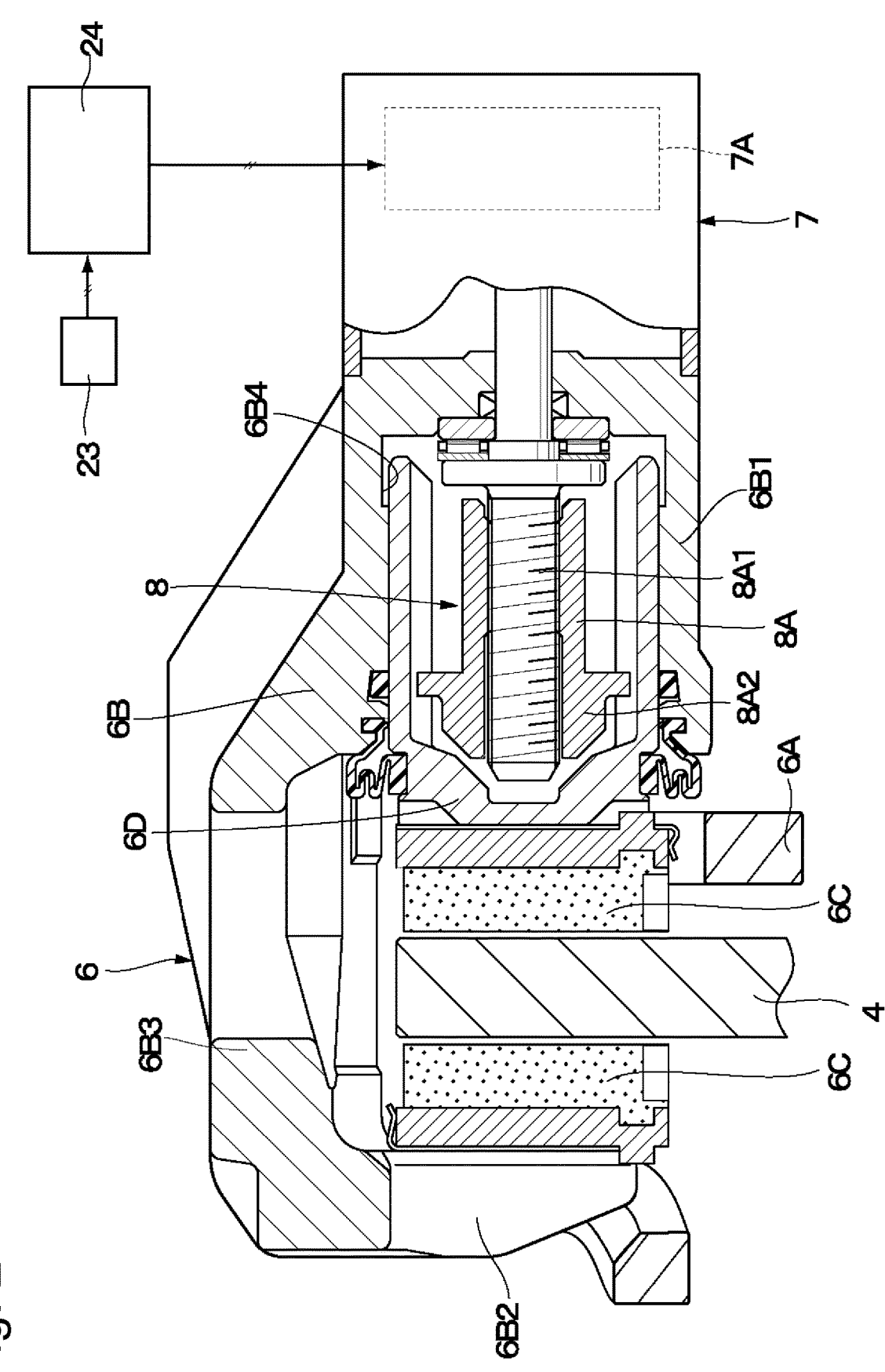
FIG. 2 is an enlarged vertical cross-sectional view of a disc brake having an electric parking brake function, which is arranged on a rear wheel side of FIG. 1.

The pair (set) of the rear-wheel disc brakes 6 arranged corresponding to the left and right rear wheels 3 is a hydraulic pressure type brake mechanism (hydraulic brake) configured to apply a braking force by pressing brake pads 6C (see FIG. 2) against the disc rotor 4 by hydraulic pressure. As illustrated in FIG. 2, the rear-wheel disc brakes 6 include, for example, a mounting member 6A called a carrier, a caliper 6B serving as a wheel cylinder, a pair of brake pads 6C serving as a braking member (friction member, friction pad), and a piston 6D serving as a pressing member. In this case, the caliper 6B and the piston 6D form a cylinder mechanism, that is, a cylinder mechanism configured to move by hydraulic pressure and press the brake pads 6C against the disc rotor 4.

The mounting member 6A is fixed to a non-rotating portion of the vehicle and is formed so as to straddle an outer peripheral side of the disc rotor 4. The caliper 6B is arranged on the mounting member 6A such that the disc rotor 4 can move in an axial direction. The caliper 6B includes a cylinder main body portion 6B1, a claw portion 6B2, and a bridge portion 6B3 connecting the cylinder main body portion 6B1 and the claw portion 6B2. A cylinder (cylinder hole) 6B4 is arranged in the cylinder body 6B1, and the piston 6D is inserted in the cylinder 6B4. The brake pads 6C are movably mounted on the mounting member 6A and are arranged so as to be in contact with the disc rotor 4. The piston 6D is configured to press the brake pads 6C against the disc rotor 4.

The caliper 6B propels the brake pads 6C by the piston 6D by supplying (adding) hydraulic pressure (brake hydraulic pressure) into the cylinder 6B4 based on an operation of a brake pedal 9, for example. At this time, the brake pads 6C are pressed on both sides of the disc rotor 4 by the claw portion 6B2 of the caliper 6B and the piston 6D. As a result, a braking force is applied to the rear wheel 3 rotating together with the disc rotor 4.

The rear-wheel disc brakes 6 further include an electric actuator 7 and a rotation-linear motion mechanism 8. The electric actuator 7 includes, for example, an electric motor 7A serving as an electric motor and a speed reducer (not shown) configured to decelerate the rotation of the electric motor 7A. The electric motor 7A serves as a propulsion source (drive source) for propelling the piston 6D. The rotation-linear motion mechanism 8 forms a holding mechanism (pressing member holding mechanism) configured to hold the pressing force of the brake pads 6C.

In this case, the rotation-linear motion mechanism 8 includes a rotation-linear motion member 8A configured to convert the rotation of the electric motor 7A into an axial-direction displacement (linear displacement) of the piston 6D and to propel the piston 6D. The rotation-linear motion member 8A is constructed from, for example, a screw member 8A1 made of a rod-shaped body on which a male screw is formed and a linear motion member 8A2 which serves as a propulsion member having a female screw hole formed on an inner peripheral side. The rotation-linear motion mechanism 8 is configured to convert the rotation of the electric motor 7A into an axial-direction displacement of the piston 6D and to hold the piston 6D propelled by the electric motor 7A. That is, the rotation-linear motion mechanism 8 applies thrust to the piston 6D by the electric motor 7A, propels the brake pads 6C by the piston 6D to press the brake pads 6C against the disc rotor 4, and holds the thrust of the piston 6D.

The rear-wheel disc brakes 6 form an electric brake mechanism by including the rotation-linear motion mechanism 8 and the electric motor 7A. The electric brake mechanism is configured to convert the rotational force of the electric motor 7A into thrust via the speed reducer and the rotation-linear motion mechanism 8, and to hold or release the braking force by causing the thrust to act on the piston 6D pressing the brake pads 6C. That is, in the electric brake mechanism, the piston 6D propelled by the rotation-linear motion mechanism 8 driven by the electric motor 7A presses the brake pads 6C against the disc rotor 4, and holds the brake pads 6C at the pressing position by stopping the electric motor 7A. The electric brake mechanism forms the electric brake device together with the parking brake control device 24 described later.

The rear-wheel disc brakes 6 are configured to propel the piston 6D by the brake hydraulic pressure generated based on an operation of the brake pedal 9, for example, to thereby apply a braking force to the wheels (rear wheels 3), and thus to the vehicle, by pressing the disc rotor 4 with the brake pads 6C. In addition to this, as described later, the rear-wheel disc brakes 6 apply a braking force (parking brake or auxiliary brake as required) to the vehicle by causing the electric motor 7A to propel the piston 6D via the rotation-linear motion mechanism 8 in response to an operation request based on, for example, a signal from a parking brake switch 23.

That is, the rear-wheel disc brakes 6 drive the electric motor 7A, and press and hold the brake pads 6C against the disc rotor 4 by propelling the piston 6D by the rotation-linear motion member 8A. In this case, the rear-wheel disc brakes 6 can hold the braking of the vehicle by propelling the piston 6D by the electric motor 7A in response to a parking brake request signal (application request signal), which is an application request for applying the parking brake. In addition to this, the rear-wheel disc brakes 6 can brake the vehicle by supplying hydraulic pressure from a hydraulic pressure source (master cylinder 12, which is described later, and a hydraulic pressure supply device 16 as required) in response to an operation of the brake pedal 9.

As described above, the rear-wheel disc brakes 6 have a rotation-linear motion mechanism 8 which presses the brake pads 6C against the disc rotor 4 by the electric motor 7A and holds the pressing force of the brake pads 6C, and can press the brake pads 6C against the disc rotor 4 by hydraulic pressure separately added to the brake pads 6C by the electric motor 7A.

Meanwhile, the pair (set) of the front wheel side disc brakes 5 arranged corresponding to the left and right front wheels 2 are configured in substantially the same manner as the rear-wheel disc brakes 6 except for the mechanism relating to the operation of the parking brake. That is, as illustrated in FIG. 1, the front-wheel disc brakes 5 include. for example, a mounting member (not shown), a caliper 5A, brake pads (not shown), and a piston 5B, but do not include, for example, the electric actuator 7 (electric motor 7A) and the rotation-linear motion mechanism 8 for operating and releasing the parking brake. However, the front-wheel disc brakes 5 are the same as the rear-wheel disc brakes 6 in terms of the point that the front-wheel disc brakes 5 are configured to propel the piston 5B by hydraulic pressure generated based on an operation of the brake pedal 9, for example, to thereby apply a braking force to the wheels (front wheels 2), and thus to the vehicle. That is, the front wheel side disc brakes 5 are a hydraulic brake mechanism (hydraulic brake) configured to apply a braking force by pressing the brake pads against the disc rotor 4 by hydraulic pressure.

The front-wheel disc brakes 5 may be, similarly to the rear-wheel disc brakes 6, a disc brake having an electric parking brake function. Further, in the embodiments, the hydraulic disc brakes 6 including the electric motor 7A are used as the electric brake mechanism (electric parking brake). However, the electric brake mechanism is not limited to this, and for example, electric disc brakes including an electric caliper, electric drum brakes configured to apply a braking force by pressing a shoe against a drum by an electric motor, disc brakes including an electric drum type parking brake, and a cable puller type electric parking brake configured to operate by applying a parking brake by pulling a cable by an electric motor may also be used. That is, as the electric brake mechanism, various types of electric brake mechanisms can be used as long as the electric brake mechanism can press (propel) a friction member (pad, shoe) against a rotating member (rotor, drum) based on the drive of an electric motor (electric actuator), and hold and release the pressing force.

The brake pedal 9 is arranged on a front board side of the vehicle body 1. The brake pedal 9 is operated by the driver stepping on the pedal during a braking operation of the vehicle. A braking force is applied to or released from each of the disc brakes 5 and 6 as a regular brake (service brake) based on the operation of the brake pedal 9. The brake pedal 9 includes a brake lamp switch, a pedal switch (brake switch), and a brake operation detection sensor (brake sensor) 10, for example, a pedal stroke sensor.

The brake operation detection sensor 10 is configured to detect presence or absence of an operation of stepping on the brake pedal 9 and the amount of that operation, and to output a corresponding detection signal to an ESC control device 17. The detection signal of the brake operation detection sensor 10 is transmitted (is output to parking brake control device 24) via a vehicle data bus 20 or a communication line (not shown) connecting the ESC control device 17 and the parking brake control device 24, for example.

The operation of stepping on the brake pedal 9 is transmitted to a master cylinder 12 which functions as a hydraulic source (hydraulic pressure source) via a booster 11. The booster 11 is configured as a negative pressure booster (atmospheric pressure booster) or an electric booster arranged between the brake pedal 9 and the master cylinder 12. The booster 11 boosts the stepping force and transmits the boosted stepping force to the master cylinder 12 when the brake pedal 9 is operated.

At this time, the master cylinder 12 generates hydraulic pressure by using brake fluid supplied (replenished) from a master reservoir 13. The master reservoir 13 serves as an operating fluid tank in which the brake fluid is stored. The mechanism for generating the hydraulic pressure by the brake pedal 9 is not limited to the configuration described above, and may be a mechanism configured to generate hydraulic pressure in response to the operation of the brake pedal 9, for example, a brake-by-wire type mechanism.

The hydraulic pressure generated in the master cylinder 12 is sent to the hydraulic pressure supply device 16

(hereinafter referred to as "ESC 16") via, for example, a pair of cylinder-side hydraulic pressure pipes 14A and 14B. The ESC 16 is arranged between each of the disc brakes 5 and 6 and the master cylinder 12. The ESC 16 is configured to supply the hydraulic pressure output from the master cylinder 12 via the cylinder-side hydraulic pipes 14A and 14B to each of the disc brakes 5 and 6 via brake-side piping portions 15A, 15B, 15C, and 15D. That is, the ESC 16 supplies hydraulic pressure (brake hydraulic pressure) corresponding to the operation of the brake pedal 9 to each of the disc brakes 5 and 6 (calipers 5A and 6B) arranged on each wheel (each front wheel 2 and each rear wheel 3). As a result, braking force can be applied to each wheel (each front wheel 2 and each rear wheel 3) independently of each other.

The ESC 16 is a hydraulic pressure control device which controls the hydraulic pressure of the hydraulic brakes (front-wheel disc brakes 5 and rear-wheel disc brakes 6). For this purpose, the ESC 16 includes a plurality of control valves, a hydraulic pump configured to pressurize the brake hydraulic pressure, an electric motor configured to drive the hydraulic pump, and a hydraulic pressure control reservoir configured to temporarily store excess brake fluid (none of those parts are shown). Each control valve and the electric motor of the ESC 16 are connected to the ESC control device 17, and the ESC 16 includes the ESC control device 17.

The opening and closing of each control valve of the ESC 16 and the drive of the electric motor are controlled by the ESC control device 17. That is, the ESC control device 17 is an ESC control unit (ESC ECU) configured to control the ESC 16. The ESC control device 17 includes a microcomputer. The microcomputer is configured to electrically drive and control (the solenoid of each control valve and the electric motor of) the ESC 16. In this case, the ESC control device 17 includes, for example, an arithmetic circuit configured to control the hydraulic pressure supply of the ESC 16 and to detect a malfunction of the ESC 16, and a drive circuit configured to drive the electric motor and each control valve (none of those parts are shown).

The ESC control device 17 individually drives and controls (the solenoid of) each control valve of the ESC 16 and the electric motor for the hydraulic pump. As a result, the ESC control device 17 individually performs, for each of the disc brakes 5 and 6, the control of reducing, holding, boosting, or pressurizing the brake hydraulic pressure (wheel cylinder hydraulic pressure) supplied to each of the disc brakes 5 and 6 through the brake-side piping portions 15A to 15D.

In this case, the ESC control device 17 can execute the following controls (1) to (8), for example, by controlling the operation of the ESC 16.

(1) Braking force distribution control of appropriately distributing the braking force to each of the wheels 2 and 3 in accordance with a ground contact load, for example, when the vehicle is braking (2) Anti-lock braking control (hydraulic ABS control) of automatically adjusting the braking force of each of the wheels 2 and 3 during braking to prevent locking (slip) of each of the wheels 2 and 3

(3) Vehicle stabilization control of suppressing understeer and oversteer to stabilize the behavior of the vehicle while detecting sideslip of each of the wheels 2 and 3 when the vehicle is traveling and appropriately automatically controlling the braking force applied to each of the wheels 2 and 3 regardless of the amount of operation of the brake pedal 9

(4) Hill-start assist control of assisting the start by holding the braking state on a slope (particularly uphill)

(5) Traction control of preventing each of the wheels 2 and 3 from slipping when starting, for example (6) Vehicle following control of holding a certain distance from the preceding vehicle (7) Lane departure avoidance control of holding a traveling lane (8) Obstacle avoidance control (automatic brake control and collision damage mitigation brake control) of avoiding a collision with an obstacle in the direction in which the vehicle is traveling During normal operation based on a brake operation by the driver, the ESC 16 directly supplies the hydraulic pressure generated by the master cylinder 12 to (calipers 5A and 6B of) the disc brakes 5 and 6. Meanwhile, for example, when anti-lock brake control is executed, the control valve for boosting pressure is closed to hold the hydraulic pressure of the disc brakes 5 and 6, and when the hydraulic pressure of the disc brakes 5 and 6 is reduced, the control valve for reducing the pressure is opened and the hydraulic pressure of the disc brakes 5 and 6 is released so as to escape to the hydraulic pressure control reservoir.

Further, in order to perform stabilization control (sideslip prevention control) when the vehicle is traveling, when the hydraulic pressure supplied to the disc brakes 5 and 6 is boosted or pressurized, the hydraulic pump is operated by the electric motor with the supply control valve in a closed state, and the brake fluid discharged from the hydraulic pump is supplied to the disc brakes 5 and 6. At this time, on a suction side of the hydraulic pump, the brake fluid in the master reservoir 13 is supplied from the master cylinder 12 side.

Electric power from a battery 18 (or a generator to be driven by the engine), which is a vehicle power source, is supplied to the ESC control device 17 through a power supply line 19. As illustrated in FIG. 1, the ESC control device 17 is connected to the vehicle data bus 20. It is also possible to use a known ABS unit in place of the ESC 16. Further, it is also possible to directly connect the master cylinder 12 and the brake-side piping portions 15A to 15D without arranging the ESC 16 (that is, omitting the ESC 16).

The vehicle data bus 20 forms a controller area network (CAN) serving as a serial communication unit mounted on the vehicle body 1. A large number of electronic devices mounted on the vehicle (for example, various types of ECUs including the ESC control device 17 and the parking brake control device 24) perform multiplex communication to and from each other in the vehicle via the vehicle data bus 20. In this case, the vehicle information transmitted to the vehicle data bus 20 is, for example, information (vehicle information) based on detection signals (output signals) from, for example, the brake operation detection sensor 10, an ignition switch, a seatbelt sensor, a door lock sensor, a door open sensor, a seat occupancy sensor, a vehicle-speed sensor, a steering angle sensor, an accelerator sensor (accelerator operation sensor), a throttle sensor, an engine-rotation sensor, a stereo camera, a millimeter-wave radar, a gradient sensor (incline sensor), a gear shift sensor (transmission data), an acceleration sensor (G sensor), a wheel-speed sensor, and a pitch sensor configured to detect movement in a vehicle pitch direction. Further examples of the vehicle information transmitted to the vehicle data bus 20 include detection signals (information) from a W/C pressure sensor 21 configured to detect the wheel cylinder pressure and an M/C pressure sensor 22 configured to detect the master cylinder pressure.

Next, the parking brake switch 23 and the parking brake control device 24 are described.

A parking brake switch (PKB-SW) 23 serving as a switch of the electric parking brake is arranged in the vehicle body 1 at a position near the driver seat (not shown). The parking brake switch 23 serves as an operation instruction unit to be operated by the driver. The parking brake switch 23 transmits to the parking brake control device 24 a signal (operation request signal) corresponding to a parking brake operation request (application request as a holding request or release request) in response to an operation instruction by the driver. That is, the parking brake switch 23 outputs to the parking brake control device 24 an operation request signal (application request signal as a holding request signal or release request signal) for causing the piston 6D, and thus the brake pads 6C, to perform an application operation (holding operation) or a release operation based on the drive (rotation) of the electric motor 7A. The parking brake control device 24 is a parking brake control unit (parking brake ECU).

When the parking brake switch 23 is operated by the driver to the braking side (application side), that is, when there is an application request (braking holding request) for applying a braking force to the vehicle, an application request signal (parking brake request signal or application command) is output from the parking brake switch 23. In this case, electric power for rotating the electric motor 7A of the rear-wheel disc brakes 6 to the braking side is supplied to the electric motor 7A via the parking brake control device 24. At this time, the rotation-linear motion mechanism 8 propels (presses) the piston 6D toward the disc rotor 4 side based on the rotation of the electric motor 7A, and holds the propelled piston 6D. As a result, the rear-wheel disc brakes 6 are in a state in which a braking force as a parking brake (or an auxiliary brake) is applied, that is, are in an application state (braking holding state).

Meanwhile, when the parking brake switch 23 is operated by the driver to the braking release side (release side), that is, when there is a release request (braking release request) for releasing the braking force of the vehicle, a release request signal (parking brake release request signal or release command) is output from the parking brake switch 23. In this case, electric power for rotating the electric motor 7A of the rear-wheel disc brakes 6 in the direction opposite to the braking side is supplied to the electric motor 7A via the parking brake control device 24. At this time, the rotation-linear motion mechanism 8 releases the holding of the piston 6D by the rotation of the electric motor 7A (releases the pressing force by the piston 6D). As a result, the rear-wheel disc brakes 6 are in a state in which the braking force as a parking brake (or auxiliary brake) is released, that is, are in a released state (braking released state).

The parking brake can be automatically applied (autoapplied) based on an automatic application request issued by the parking brake control device 24 based on application judgment logic when, for example, the vehicle has stopped for a predetermined period of time (for example, when the vehicle is judged to be stopped because a state in which the detection speed of the vehicle-speed sensor is less than 5 km/h has continued for a predetermined period of time due to deceleration while traveling), when the engine has stopped, when the shift lever is operated to a "P" (parking) position, when the door is opened, and when the seatbelt is released. Further, the parking brake can be automatically released (auto-released) based on an automatic release request issued by the parking brake control device 24 based on parking brake release judgment logic when, for example, the vehicle is traveling (for example, when the vehicle is judged to be traveling because a state in which the detection speed of the vehicle-speed sensor is 6 km/h or more has continued for a predetermined period of time due to acceleration from a stationary state), when the accelerator pedal is operated, when the clutch pedal is operated, and when the shift lever is operated to a position other than the "P" or "N" position. Auto application and auto release can be configured as a switch malfunction auxiliary function which automatically applies or releases the braking force when the parking brake switch 23 malfunctions.

Further, when the parking brake switch 23 is operated while the vehicle is traveling, more specifically, when there is a request for a dynamic parking brake (dynamic application), for example, when the parking brake is urgently used as an auxiliary brake while the vehicle is traveling, the braking force can be applied and released by the ESC 16 in accordance with the operation of the parking brake switch 23, for example. In this case, for example, the parking brake control device 24 outputs to the ESC control device 17 a braking command (for example, a hydraulic pressure request signal or a target hydraulic pressure signal) corresponding to the operation of the parking brake switch 23 via the vehicle data bus 20 or the communication line. As a result, the ESC 16 applies a braking force based on hydraulic pressure while the parking brake switch 23 is operated to the braking side (while the operation to the braking side continues) based on the braking command from the parking brake control device 24. When the operation is completed, the braking force based on hydraulic pressure is released.

Meanwhile, when the parking brake switch 23 is operated while the vehicle is traveling, in place of applying and releasing the braking force by the ESC 16, for example, the braking force can be applied and released by driving the electric motor 7A of the rear-wheel disc brakes 6. In this case, for example, the parking brake control device 24 applies the braking force while the parking brake switch 23 is operated to the braking side (while the operation to the braking side continues), and when the operation is complete, the parking brake control device 24 releases the braking force. At this time, the parking brake control device 24 can be configured to automatically apply and release the braking force (perform ABS control) in accordance with the state of the wheels (each rear wheel 3), that is, whether or not the wheels lock (slip).

Figure 3:
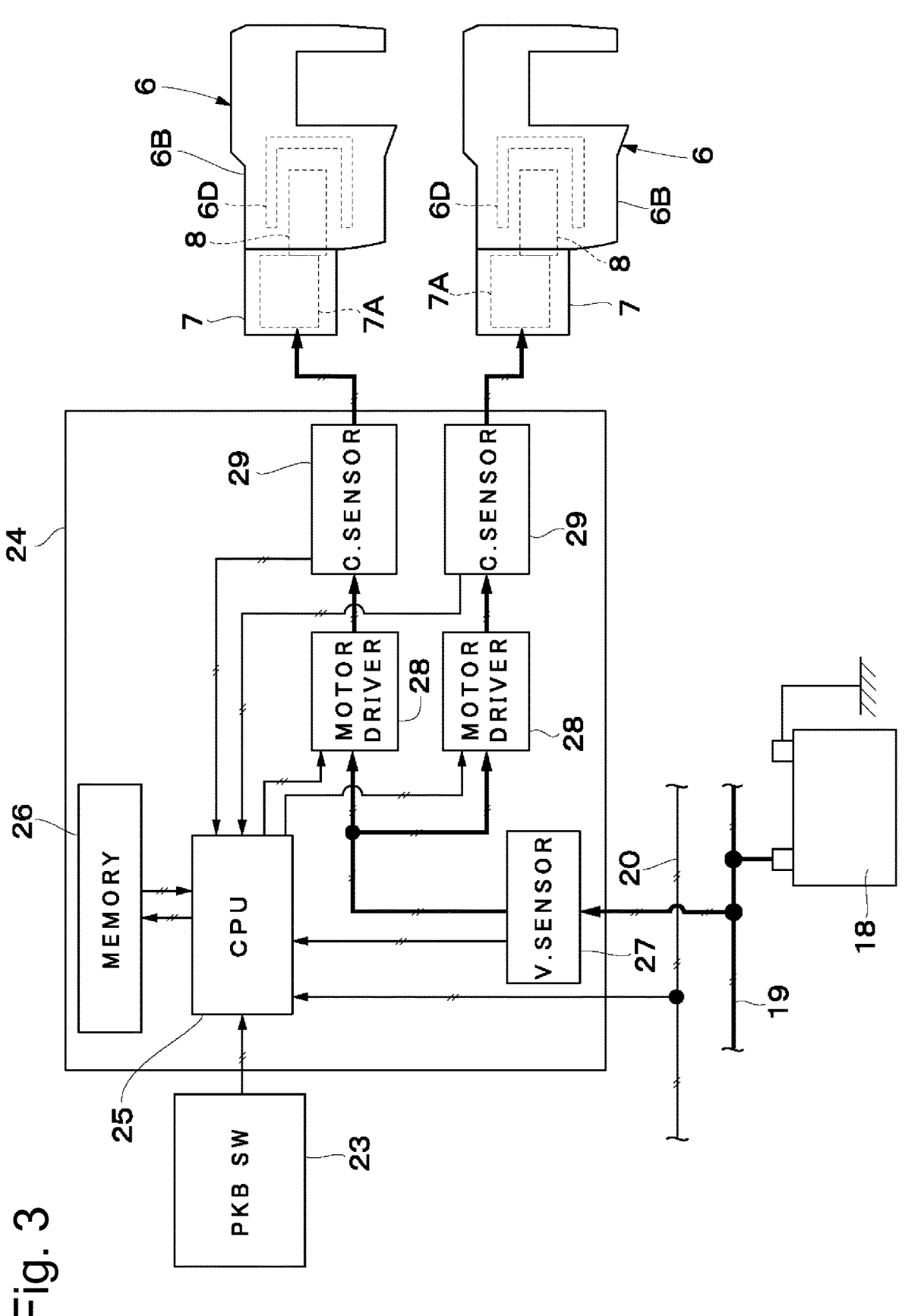
FIG. 3 is a block diagram for illustrating a parking brake control device of FIG. 1 together with a rear-wheel disc brake and other parts.

The parking brake control device 24 serving as a control device (electric brake control device) forms an electric brake device together with (the electric motor 7A and rotation-linear motion mechanism 8 of) the rear-wheel disc brakes 6. The parking brake control device 24 is configured to control the driving of the electric motor 7A. For this purpose, as illustrated in FIG. 3, the parking brake control device 24 includes an arithmetic circuit (CPU) 25 built from a micro-computer, for example, and a memory 26. Electric power from the battery 18 (or a generator driven by the engine) is supplied to the parking brake control device 24 through the power supply line 19.

The parking brake control device 24 controls the drive of the electric motors 7A and 7A of the rear-wheel disc brakes 6 and 6, and generates a braking force (parking brake or auxiliary brake) when the vehicle is parked or stopped (and during traveling as required). That is, the parking brake control device 24 operates (applies and releases) the disc brakes 6 and 6 as parking brakes (auxiliary brakes as required) by driving the left and right electric motors 7A and 7A. For this purpose, an input side of the parking brake control device 24 is connected to the parking brake switch 23 and an output side of the parking brake control device 24 is connected to the electric motors 7A and 7A of the disc brakes 6 and 6. The parking brake control device 24 includes the arithmetic circuit 25 for, for example, detecting an operation by the driver (operation of the parking brake switch 23), judging whether or not to drive the electric motors 7A and 7A, and judging whether or not to stop the electric motors 7A and 7A, and motor drive circuits 28 and 28 for controlling the electric motors 7A and 7A.

The parking brake control device 24 drives the left and right electric motors 7A and 7A based on an operation request (application request or release request) generated by the driver operating the parking brake switch 23, an operation request based on application/release judgment logic of the parking brake, or an operation request based on ABS control, and applies (holds) or releases the left and right disc brakes 6 and 6. At this time, in the rear-wheel disc brakes 6, the piston 6D and the brake pads 6C are held or released by the rotation-linear motion mechanism 8 based on the drive of each electric motor 7A. In this way, the parking brake control device 24 drives and controls the electric motor 7A to propel the piston 6D (and thus the brake pads 6C) in response to the operation request signal for a holding operation (application) or release operation (release) of the piston 6D (and thus the brake pads 6C.)

As illustrated in FIG. 3, in addition to the memory 26 serving as a storage unit, the arithmetic circuit 25 of the parking brake control device 24 is connected to, for example, the parking brake switch 23, the vehicle data bus 20, a voltage sensor unit 27, the motor drive circuits 28, and current sensor units 29. Various types of state amounts of the vehicle required for control (operation) of the parking brake, that is, various types of pieces of vehicle information, can be acquired from the vehicle data bus 20. Further, the parking brake control device 24 can output information and commands to various types of ECUs, including the ESC control device 17, via the vehicle data bus 20 or the communication line.

The vehicle information acquired from the vehicle data bus 20 may also be acquired by directly connecting a sensor configured to detect the information to (the arithmetic circuit 25 of) the parking brake control device 24. Further, the arithmetic circuit 25 of the parking brake control device 24 may be configured such that an operation request based on the above-mentioned judgment logic or ABS control is input from another control device (for example, ESC control device 17) connected to the vehicle data bus 20. In this case, the application/release judgment based on the above-mentioned judgment logic and the ABS control of the parking brake can be performed by another control device, for example, the ESC control device 17, in place of the parking brake control device 24. That is, it is possible to integrate the control content of the parking brake control device 24 into the ESC control device 17.

The parking brake control device 24 includes the memory 26 serving as a storage unit including, for example, a flash memory, a ROM, a RAM, or an EEPROM. The memory 26 is configured to store the above-mentioned parking brake application/release judgment logic and the ABS control program. In addition to this, the memory 26 stores, for example, a processing program for executing the processing flow illustrated in FIG. 4 described later, that is, a processing program to be used for control processing when the electric parking brake is applied.

In the embodiments, the parking brake control device 24 is separated from the ESC control device 17, but the parking brake control device 24 and the ESC control device 17 may be integrally configured (that is, integrated as a single braking control device). Further, the parking brake control device 24 controls two rear-wheel disc brakes 6 and 6 on the left and right, but the parking brake control device 24 may be arranged for each of the left and right rear-wheel disc brakes 6 and 6. In this case, each parking brake control device 24 may be integrally arranged with the rear-wheel disc brake 6.

As illustrated in FIG. 3, the parking brake control device 24 includes, for example, the voltage sensor unit 27 configured to detect the voltage from the power supply line 19, the left and right motor drive circuits 28 and 28 configured to drive the left and right electric motors 7A and 7A, respectively, and the left and right current sensor units 29 and 29 configured to detect the motor current of the left and right electric motors 7A and 7A, respectively. The voltage sensor unit 27, the motor drive circuits 28, and the current sensor units 29 are each connected to the arithmetic circuit 25. As a result, in the arithmetic circuit 25 of the parking brake control device 24, when the parking brake is applied or released, for example, the judgment (application completion judgment and release completion judgment) of stopping the drive of the electric motor 7A can be performed based on (a change in) the current value of the electric motor 7A detected by the current sensor units 29. In the illustrated example, the voltage sensor unit 27 is configured to detect (measure) the power supply voltage, but the voltage sensor unit (voltage sensor) may be configured to independently measure for the left and the right the voltage between the terminals of the electric motors 7A and 7A, for example.

Incidentally, in the case of applying the parking brake, when the electric motor current (motor current), which is proportional to the thrust, continuously exceeds an application completion threshold value set in advance for a predetermined period of time (for example, 30 ms or 3 control cycles), application may be judged to be complete and the electric motor 7A may be stopped. However, the current value increases during a predetermined period of time from the time when the application completion threshold value is exceeded until the application completion is established (the electric motor 7A is stopped). This increasing current value changes depending on the slope of the motor current. As a result, the current value (arrival current) at the time when application is complete, that is, the current value (arrival current) immediately before the electric motor 7A actually stops, also changes depending on the slope of the motor current at the time of application, and the thrust may vary. When it is possible to reduce the variation in thrust in the state in which application is complete, generation of excessive thrust can be suppressed, and the calipers 6B and 6B of the rear-wheel disc brakes 6 and 6 can be made smaller and lighter. For this reason, for example, when application is judged to be complete and the electric motor 7A is stopped at the same time as when the current value exceeds the application completion threshold value, it may be possible to suppress the variation in thrust. However, when the current value fluctuates due to noise, for example, and temporarily exceeds the application completion threshold value, there is a possibility that application is erroneously judged as being complete.

Therefore, in the embodiments, the following configuration is adopted such that variation in thrust can be suppressed while ensuring robustness against erroneous judgment of application completion when the current value has fluctuated. That is, in the first embodiment, the time for the motor current value to reach the application completion threshold value is estimated from changes in the current (motor current) of the electric motor 7A over time, and judgment of application being complete is permitted only after that time has elapsed. As a result, robustness against current fluctuation is ensured, and variation in the arrival current (thrust) is suppressed through judgement that application completion has been established at a control cycle exceeding the current threshold value.

That is, the parking brake control device 24 is a control unit configured to control the electric motor 7A. The parking brake control device 24 determines a judgment timing (time) for judging, when there is a request to hold the brake pads 6C (application command), whether or not to stop the electric motor 7A (holding of the brake pads 6C is complete). In this case, the parking brake control device 24 determines (calculates) the judgment timing for judging whether or not to stop the electric motor 7A based on a change trend (change amount or slope) of the current value (motor current I) of the electric motor 7A. When the determined judgment timing is reached, the parking brake control device 24 judges whether or not to stop the electric motor 7A.

Figure 4:
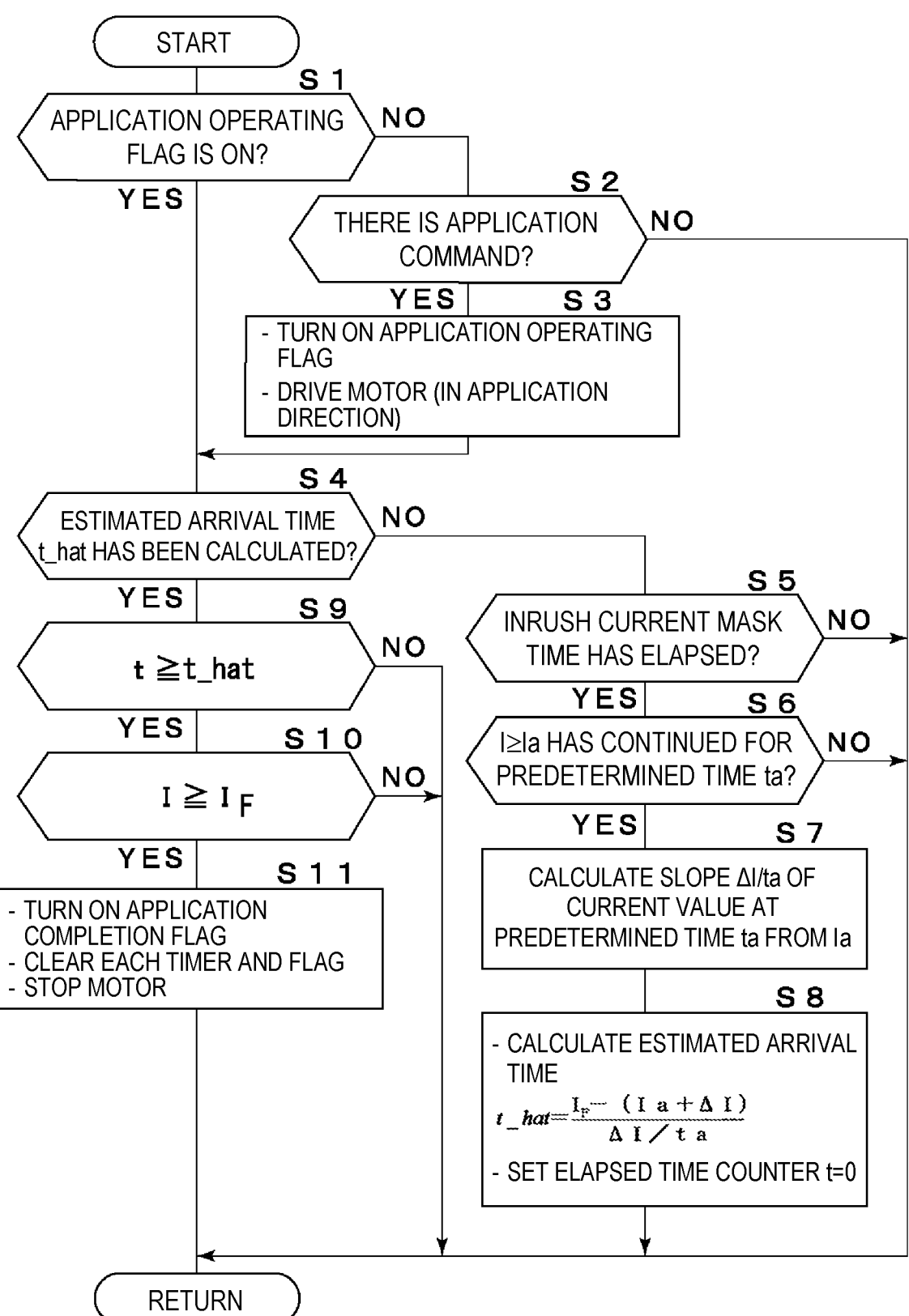
FIG. 4 is a flowchart for illustrating control processing of the parking brake control device in the first embodiment.

That is, the parking brake control device 24 determines (calculates) the timing of stopping the electric motor 7A based on the change trend of the current value of the electric motor 7A while the electric motor 7A is being driven in the application direction based on an application command. When the determined timing is reached, the parking brake control device 24 judges that the electric motor 7A is to be stopped, and stops the electric motor 7A. In this case, the parking brake control device 24 judges, when the judgment timing is reached, to stop the electric motor 7A when the current value of the electric motor 7A is equal to or more than a predetermined value (application completion current threshold value IF). Further, the parking brake control device 24 determines the judgment timing for judging whether or not to stop the electric motor 7A based on the change trend of the current value of the electric motor 7A when there has been an increase in the current value after a predetermined period of time (inrush current mask time) has elapsed since the electric motor 7A was driven. The control of the application drive of the electric motor 7A by the parking brake control device 24, that is, the control processing illustrated in FIG. 4, is described in detail later.

The four-wheeled automobile brake system according to the embodiments has the configuration described above, and the operation of that brake system is now described next.

When the driver of the vehicle steps on and operates the brake pedal 9, the stepping force is transmitted to the master cylinder 12 via the booster 11, and brake hydraulic pressure is generated by the master cylinder 12. The brake hydraulic pressure generated in the master cylinder 12 is supplied to each of the disc brakes 5 and 6 via the cylinder-side hydraulic pressure pipes 14A and 14B, the ESC 16, and the brake-side piping portions 15A, 15B, 15C, and 15D to apply a braking force to each of the left and right front wheels 2 and each of the left and right rear wheels 3.

In this case, in each of the disc brakes 5 and 6, the pistons 5B and 6D are slidably displaced toward the brake pads 6C as the brake hydraulic pressure in the calipers 5A and 6B rises, and the brake pads 6C are pressed against the disc rotors 4 and 4. As a result, a braking force based on the brake hydraulic pressure is applied. Meanwhile, when the brake operation is released, the supply of the brake hydraulic pressure to the calipers 5A and 6B is stopped, which causes the pistons 5B and 6D to move away (retract) from the disc rotors 4 and 4. As a result, the brake pads 6C separate from the disc rotors 4 and 4, and the vehicle returns to a non-braking state.

Next, when the driver of the vehicle operates the parking brake switch 23 to the braking side (application side), power is supplied from the parking brake control device 24 to the electric motor 7A of the left and right rear-wheel disc brakes 6, and the electric motor 7A is rotated and driven. In the rear-wheel disc brakes 6, the rotational motion of the electric motor 7A is converted into a linear motion by the rotation-linear motion mechanism 8, and the piston 6D is propelled by the rotation-linear motion member 8A. As a result, the disc rotor 4 is pressed by the brake pads 6C. At this time, the rotation-linear motion mechanism 8 (linear motion member 8A2) holds a braking state by a frictional force (holding force) produced by screwed engagement, for example. As a result, the rear-wheel disc brakes 6 are operated (applied) as a parking brake. That is, even after the power supply to the electric motor 7A is stopped, the piston 6D is held at the braking position by the rotation-linear motion mechanism 8.

Meanwhile, when the driver operates the parking brake switch 23 to the braking release side (release side), power is supplied from the parking brake control device 24 to the electric motor 7A so that the motor is driven in reverse. As a result of this power supply, the electric motor 7A is rotated in the direction opposite to the direction taken when the parking brake is operated (applied). At this time, the holding of the braking force by the rotation-linear motion mechanism 8 is released, and the piston 6D can be displaced in the direction away from the disc rotor 4. As a result, the rear-wheel disc brakes 6 are released from the operation as a parking brake.

Next, the control processing performed by the arithmetic circuit 25 of the parking brake control apparatus 24 is described with reference to FIG. 4. The control processing of FIG. 4 is repeatedly executed in a predetermined control cycle (for example, 10 msec) during the period in which the parking brake control apparatus 24 is energized, for example.

When the parking brake control apparatus 24, which is an electronic control unit (ECU), is activated, the control processing of FIG. 4 is started. In Step S1, the parking brake control apparatus 24 judges whether or not an application operating flag is ON. The application operating flag is a judgment flag for judging whether or not an application operation is being performed, and is turned ON during the application operation, that is, when the electric motor 7A is being driven in the application direction. Specifically, the application operating flag is turned ON in the processing of Step S3 and turned OFF in the processing of Step S11 described later.

When Step S1 is judged to be "NO", that is, when the application operating flag is judged to be OFF, the processing advances to Step S2. When Step S1 is judged to be "YES", that is, when the application operating flag is judged to be ON, the processing advances to Step S4. In Step S2, it is judged whether or not there is an application command. In Step S2, it is judged whether or not an application command has been output, for example, from the parking brake switch 23 or based on the application judgment logic of the parking brake. When Step S2 is judged to be "YES", that is, when it is judged that there is an application command, the processing advances to Step S3. Meanwhile, when Step S2 is judged to be "NO", that is, when it is judged that there is not an application command, the processing returns to the start. That is, the processing returns to the start, and the processing after Step S1 is repeated.

In Step S3, the application operating flag is turned ON. Further, the electric motor 7A is driven in the application direction. In Step S3, together with turning on the application operating flag, when the electric motor 7A starts to be driven in the application direction, the processing advances to Step S4. In Step S4, it is judged whether or not a variable t_hat for determining the timing for judging the application completion, that is, an estimated arrival time t_hat, has already been calculated during the application operation this time. When Step S4 is judged to be "NO", that is, when it is judged that the estimated arrival time t_hat has not been calculated, the processing advances to Step S5. Meanwhile, when Step S4 is judged to be "YES", that is, when it is judged that the estimated arrival time t_hat has been calculated, the processing advances to Step S9.

In Step S5, it is judged whether or not the inrush current mask time has elapsed. The inrush current mask time is the time since the electric motor 7A started to operate in the application direction. As the inrush current mask time, a time in which the inrush current sufficiently settles is set. When Step S5 is judged to be "NO", that is, when it is judged that the inrush current mask time has not elapsed, the processing returns to the start. This is to prevent the inrush current from influencing the estimation (calculation) of the estimated arrival time t_hat in the following Step S6 and Step S7. Meanwhile, when Step S5 is judged to be "YES", that is, when it is judged that the inrush current mask time has elapsed, the processing advances to Step S6.

In Step S6, it is judged whether or not the current of the electric motor 7A, that is, the motor current I, has continued to be equal to or more than a change trend judgment threshold value Ia for a predetermined time "ta" or more. When Step S6 is judged to be "NO", that is, when it is judged that the motor current I has not continued to be equal to or more than the change trend judgment threshold value Ia for the predetermined time "ta" or more, the processing returns to the start. Meanwhile, when Step S6 is judged to be "YES", that is, when it is judged that the motor current I has continued to be equal to or more than the change trend judgment threshold value Ia for the predetermined time "ta" or more, the processing advances to Step S7. In this case, when the change trend judgment threshold value Ia, that is, the current value threshold value Ia for starting judgment of a current change over time, is set to be high, there is a possibility that the current change over time is not calculated before the motor current I reaches the application completion current threshold value IF. Meanwhile, when the change trend judgment threshold value Ia is set to be low, the current change over time at the time when application completion is judged may not be correctly expressed due to, for example, non-linearity of the pad rigidity. Therefore, the change trend judgment threshold value Ia is set so as to satisfy the conditions described above, for example, to 3 A. Further, when the predetermined time "ta", that is, the predetermined time "ta" indicating the interval for judging the current change over time, is set to be short, the judgment is easily affected by noise, for example. Meanwhile, when the predetermined time "ta" is set to be long, the motor current I may reach the application completion current threshold value IF before a change in the motor current I over time is detected. Therefore, the predetermined time "ta" is set so as to satisfy the conditions described above, for example, to 30 ms.

In Step S7, the slope of the amount of change in the current, that is, a current change over time $\Delta I/ta$, is calculated from an amount of increase in the current $\Delta I$ during the predetermined time "ta" after the motor current I becomes a value equal to or more than the change trend judgment threshold value Ia. In Step S8 following Step S7, the estimated arrival time t_hat, which is the period of time required for the motor current I to reach the application completion current threshold value IF, is calculated (estimated) based on the current change over time ΔI/ta obtained in Step S7. The estimated arrival time t_hat is obtained from the following Formula (1).

$$t\_hat = \frac{I_P - (Ia + \Delta I)}{\Delta I / ta} \qquad [\text{Formula 1}]$$

Then, in Step S8, an elapsed time counter "t" since calculation of the estimated arrival time t_hat is set to 0. The elapsed time counter counts the elapsed time since the elapsed time counter was set to 0. In Step S8, together with calculating the estimated arrival time t_hat, when the elapsed time counter "t" starts counting, the processing returns to the start. Meanwhile, when Step S4 is judged to be "YES", that is, when it is judged that the estimated arrival time t_hat has been calculated, the processing advances to Step S9. In Step S9, it is judged whether or not the elapsed time counter "t" is equal to or more than the estimated arrival time t_hat. When Step S9 is judged to be "NO", that is, when it is judged that the elapsed time counter "t" is not equal to or more than the estimated arrival time t_hat, the processing returns to the start. Meanwhile, when Step S9 is judged to be "YES", that is, when it is judged that the elapsed time counter "t" is equal to or more than the estimated arrival time t_hat, the processing advances to Step S10. In Step S10, it is judged whether or not the motor current I is equal to or more than the application completion current threshold value IF. When Step S10 is judged to be "NO", that is, when it is judged that the motor current I is not equal to or more than the application completion current threshold value IF, the processing returns to the start. When Step S10 is judged to be "YES", that is, when it is judged that the motor current I is equal to or more than the application completion current threshold value IF, the processing advances to Step S11. In Step S11, the application completion flag is turned ON, and other flags (for example, application operating flag) are cleared (turned OFF). Further, each timer (for example, the elapsed time counter "t") is cleared (turned OFF). Moreover, the electric motor 7A is stopped, and the processing returns to the start.

Figure 5:
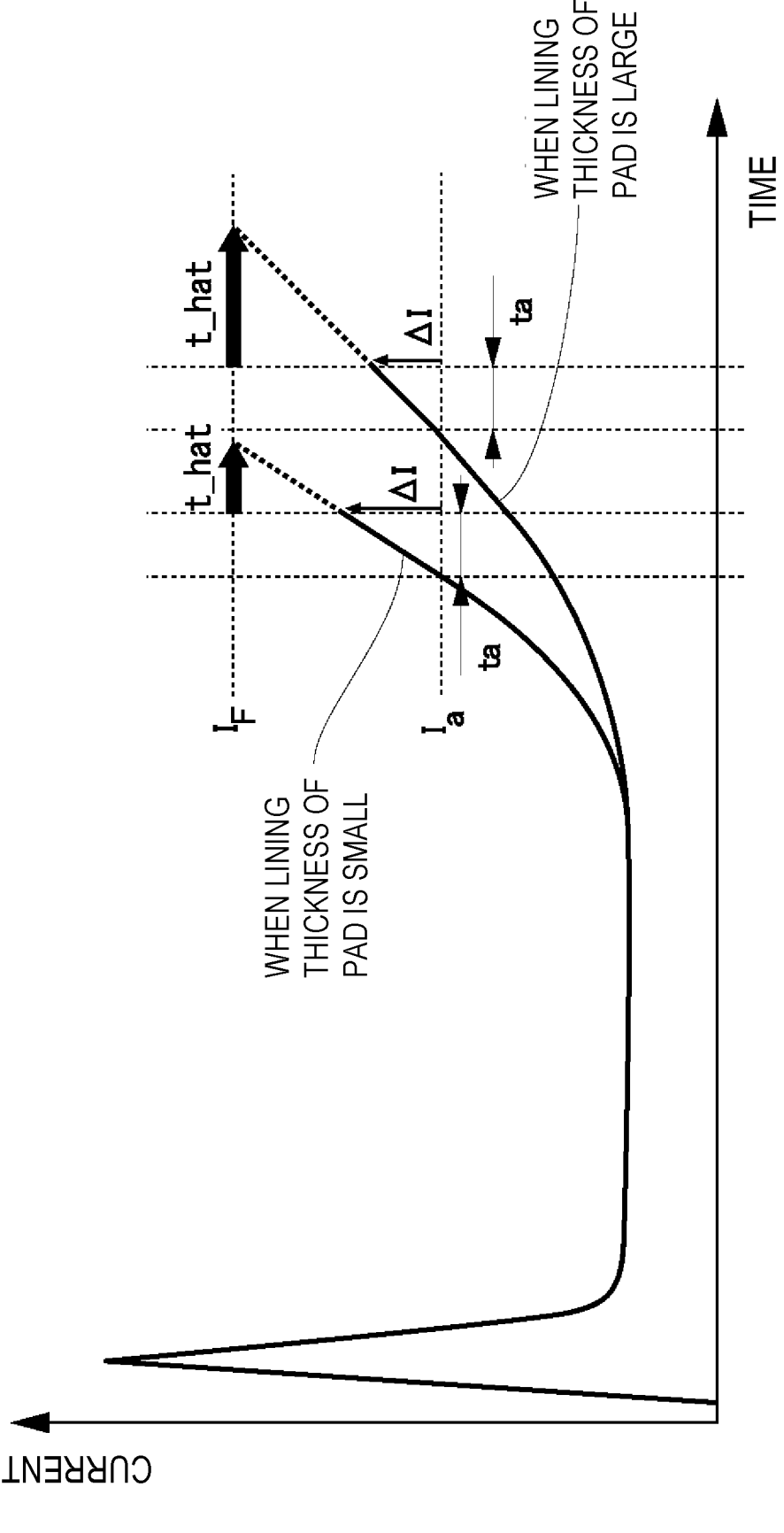
FIG. 5 is a characteristic curve diagram for showing an example of a current change over time in the first embodiment.

In FIG. 5, there is shown an example of current change over time during an application operation in the first embodiment. When an application command is output from the parking brake switch 23 or based on the application judgment logic of the parking brake, for example, the parking brake control device 24 starts driving the electric motor 7A (Step S3). When the inrush current immediately after the start of driving the electric motor 7A settles and the current value becomes Ia or more, the parking brake control device 24 calculates the current slope ΔI/ta based on the amount of increase in the current ΔI from the time when the current value becomes Ia or more until the predetermined time "ta" elapses (Step S7). Then, the parking brake control device 24 calculates the estimated arrival time t_hat from the present time until the current value reaches the application completion current threshold value IF based on the current slope ΔI/ta (Step S8). When the elapsed time counter "t" becomes equal to or more than the estimated arrival time t_hat and it is judged that the current value has reached the application completion current threshold value IF (Step S9 and Step S10), the parking brake control device 24 stops the electric motor 7A (Step S11). Therefore, as shown in FIG. 5, the electric motor 7A can be stopped when the current value reaches the application completion current threshold value IF regardless of the thickness of the pad lining. As a result, it is possible to prevent the braking force of the parking brake (thrust based on the drive of the electric motor 7A) from becoming excessive or too small.

As described above, according to the first embodiment, the parking brake control device 24 determines a judgment timing (estimated arrival time t_hat) for judging whether or not to stop the electric motor 7A based on a change trend (ΔI/ta) of the current value of the electric motor 7A. Therefore, it is possible to determine the judgment timing in consideration of current fluctuations. This enables the electric motor 7A to be stopped at the proper timing, and the arrival current at the time of a current fluctuation, that is, excessive or insufficient thrust, to be suppressed. As a result, variation in thrust can be reduced and excessive thrust can be suppressed, which enables responsiveness to be improved, operating noise to be reduced, the electric brake mechanism (caliper 6B) to be made smaller and lighter, and the cost to be reduced.

According to the first embodiment, the parking brake control device 24 judges, when the judgment timing is reached, that the electric motor 7A to be stopped when the current value (motor current I) of the electric motor 7A is equal to or more than a predetermined value (application completion current threshold value IF). Therefore, the electric motor 7A can be stopped under a state in which the current value is equal to or more than the predetermined value (application completion current threshold value IF), and it is possible to prevent the thrust from being insufficient.

According to the first embodiment, the parking brake control device 24 determines the judgment timing (estimated arrival time t_hat) for judging whether or not to stop the electric motor 7A based on the change trend of the current value of the electric motor 7A when there has been an increase in the current value after a predetermined period of time has elapsed (after inrush current mask time has elapsed) since the electric motor 7A was driven. Therefore, the judgment timing can be determined while avoiding the inrush current at the start of driving the electric motor 7A.

Figure 6:
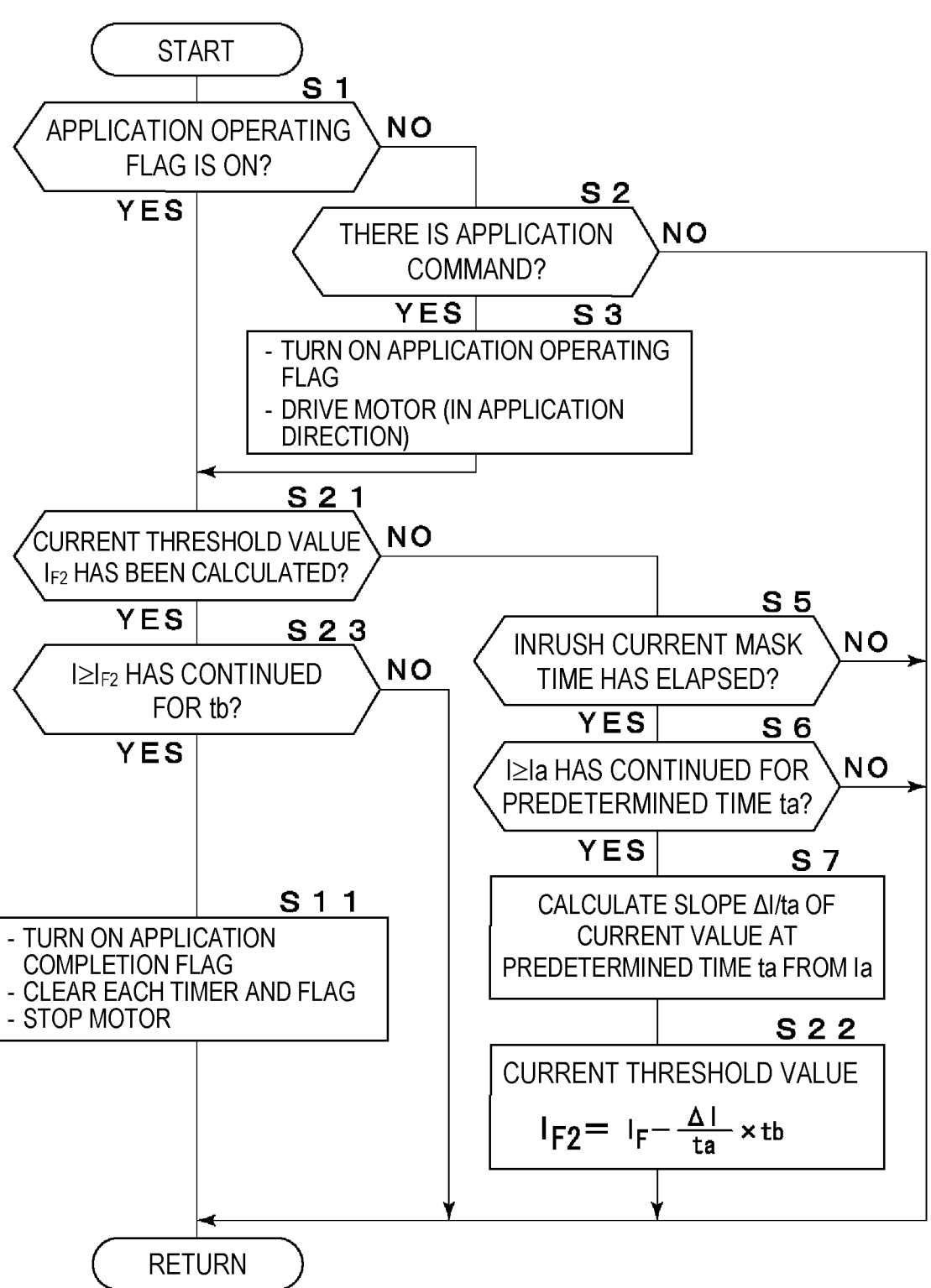
FIG. 6 is a flowchart for illustrating control processing of a parking brake control device in a second embodiment of the present invention.
Figure 7:
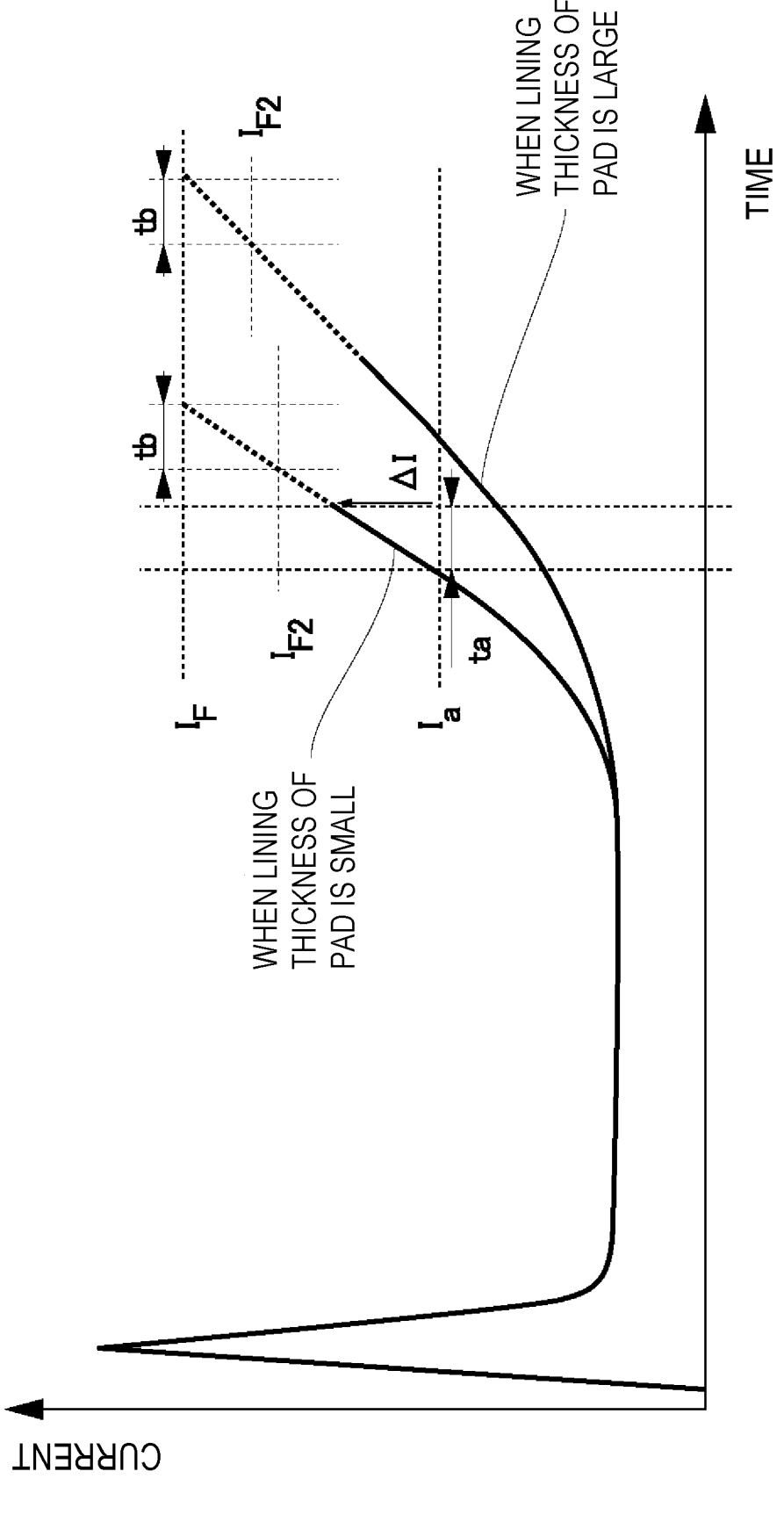
FIG. 7 is a characteristic curve diagram for showing an example of a current change over time in the second embodiment.

Next, FIG. 6 and FIG. 7 are illustrations of a second embodiment of the present invention. A feature of the second embodiment is that a completion judgment current threshold value reached by the application completion current threshold value IF after a predetermined period of time set in advance elapses is calculated based on the change trend of the current value, and it is judged that the electric motor is to be stopped after a predetermined period of time has elapsed from the calculated completion judgment current threshold value. In the second embodiment, parts which are the same as those in the first embodiment are designated by the same reference numerals, and description thereof is omitted.

In the second embodiment, application completion is established (that is, application is judged to be complete and the electric motor 7A is to be stopped) when the motor current I continuously exceeds a completion judgment current threshold value IF2 for a predetermined time "tb" (for example, 30 ms=3 control cycles). As a result, robustness is ensured. Further, in the second embodiment, the completion judgment current threshold value IF2 is corrected based on the change in the motor current over time so that the motor current value when the electric motor 7A is stopped is constant, that is, so that the electric motor 7A is stopped at the application completion current threshold value IF. As a result, variation in the arrival current is suppressed.

That is, in the second embodiment, the parking brake control device 24 determines the timing at which the electric motor 7A is to be stopped based on the change trend of the current value (motor current I) of the electric motor 7A when the electric motor 7A is being driven in the application direction by the application command. In this case, the parking brake control device 24 determines (calculates) the completion judgment current threshold value IF2 which becomes the application completion current threshold value IF when the predetermined time "tb" elapses. The parking brake control device 24 judges that the electric motor 7A is to be stopped after the predetermined time "tb" from the completion judgment current threshold value IF2, and stops the electric motor 7A.

FIG. 6 is an illustration of control processing in the second embodiment, that is, control processing performed in the arithmetic circuit 25 of the parking brake control device 24. In the second embodiment, the processing program for executing the processing flow illustrated in FIG. 6 is stored in the memory 26 of the parking brake control device 24. Step S1, Step S2, Step S3, Step S5, Step S6, Step S7, and Step S11 of FIG. 6 are the same processing as that of Step S1, Step S2, Step S3, Step S5, Step S6, Step S7, and Step S11 of FIG. 4 in the first embodiment, and therefore description of those steps is omitted here.

In Step S21, which follows "YES" in Step S1 or follows Step S3, it is judged whether or not the completion judgment current threshold value IF2 has been calculated. When Step S21 is judged to be "NO", that is, when it is judged that the completion judgment current threshold value IF2 has not been calculated, the processing advances to Step S5. Meanwhile, when Step S21 is judged to be "YES", that is, when it is judged that the completion judgment current threshold value IF2 has been calculated, the processing advances to Step S23. In Step S22 following Step S7, the completion judgment current threshold value IF2 is calculated. Specifically, in Step S22, the completion judgment current threshold value IF2 is calculated based on the "current change over time ΔI/ta obtained in Step S7" and the "predetermined time "tb" from when completion judgment current threshold value IF2 is exceeded until application completion judgment is established." The completion judgment current threshold value IF2 is calculated from the following Formula (2). That is, based on Formula (2), as the current change ΔI/ta becomes larger, the completion judgment current threshold value IF2 is set to be smaller so that the current value at the time of application completion becomes the application completion current threshold value IF.

$$I_{F2} = I_F - \frac{\Delta I}{ta} \times tb \qquad \text{[Formula 2]}$$

Meanwhile, in Step S23, which follows "YES" in Step S21, it is judged whether or not the motor current I has continuously exceeded the completion judgment current threshold value IF2 for the predetermined time "tb" or more. When Step S23 is judged to be "NO", that is, when it is judged that the motor current I has not continuously exceeded the completion judgment current threshold value IF2 for the predetermined time "tb" or more, the processing returns to the start. Meanwhile, when Step S23 is judged to be "YES", that is, when it is judged that the motor current I has continuously exceeded the completion judgment current threshold value IF2 for the predetermined time "tb" or more, the processing advances to Step S11. When the current change is obtained in Step S22, the voltage applied to the electric motor 7A may be used as an alternative characteristic of the current change over time.

In FIG. 7, there is shown an example of current change over time during an application operation in the second embodiment. When an application command is output from the parking brake switch 23, for example, the parking brake control device 24 starts driving the electric motor 7A (Step S3). When the inrush current immediately after the start of driving the electric motor 7A settles and the current value becomes Ia or more, the parking brake control device 24 calculates the current slope ΔI/ta based on the amount of increase in the current ΔI from the time when the current value becomes Ia or more until the predetermined time "ta" elapses (Step S7). Then, the parking brake control device 24 calculates the completion judgment current threshold value IF2 based on the "current slope ΔI/ta" and the "predetermined time "tb" from when the completion judgment current threshold value IF2 is exceeded until application completion judgment is established" (Step S22). When the parking brake control device 24 judges that the motor current I has continuously exceeded the completion judgment current threshold value IF2 for the predetermined time "tb" or more (Step S23), the parking brake control device 24 stops the electric motor 7A (Step S11). Therefore, as shown in FIG. 7, the electric motor 7A can be stopped when the current value reaches the application completion current threshold value IF regardless of the thickness of the pad lining. As a result, it is possible to prevent the braking force of the parking brake (thrust based on the drive of the electric motor 7A) from becoming excessive or too small.

In the second embodiment, the judgment timing for judging whether or not to stop the electric motor 7A is determined in Step S21, Step S22, and Step S23 as described above, and it is judged that the electric motor 7A is to be stopped at the determined judgment timing (the electric motor 7A is stopped). There is no particular difference in the basic action of the second embodiment from that of the first embodiment described above. That is, like in the first embodiment, in the second embodiment as well, it is possible to suppress variation in the arrival current (that is, thrust) while robustness against current fluctuation is ensured.

Figure 8:
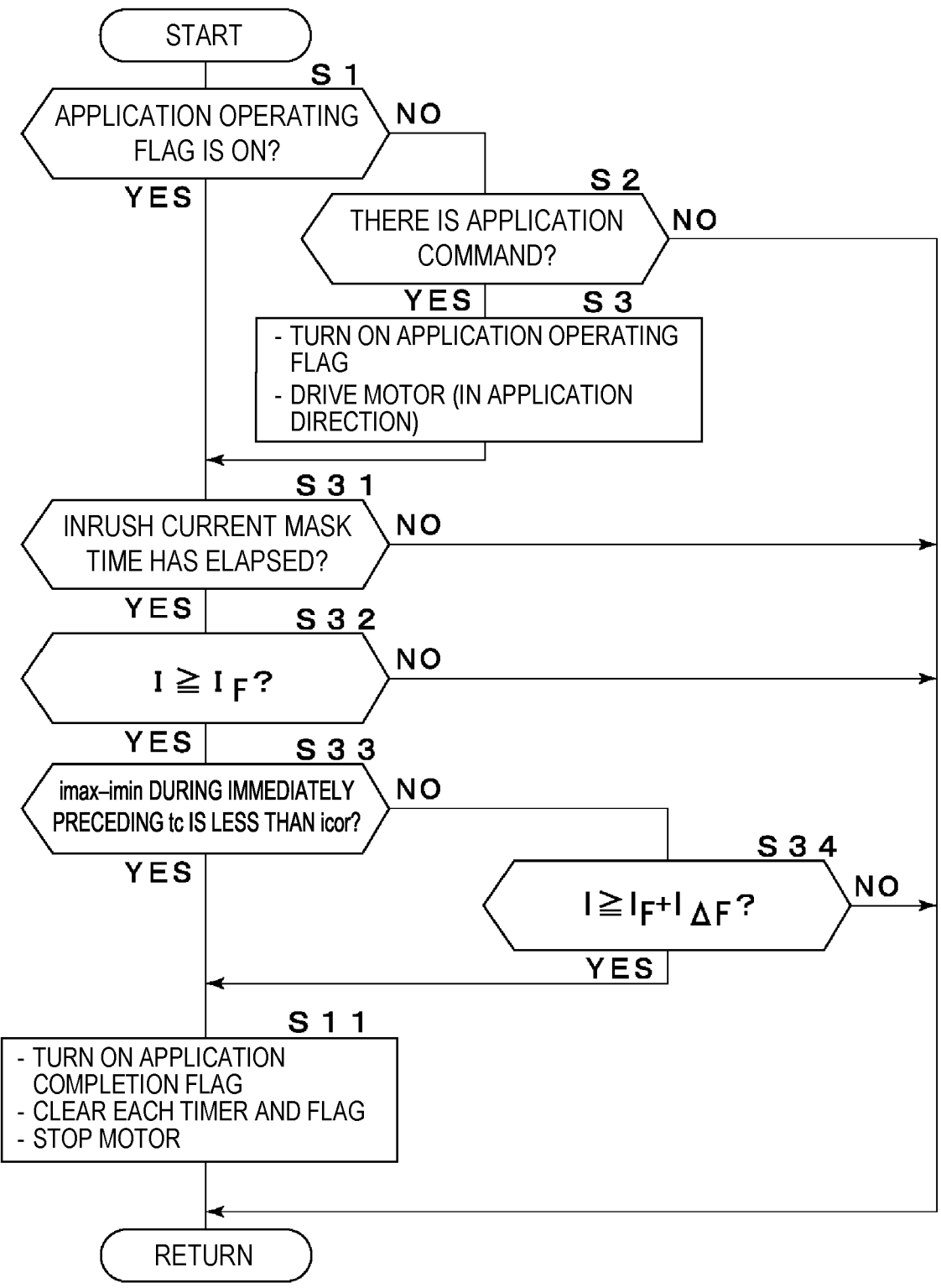
FIG. 8 is a flowchart for illustrating control processing of a parking brake control device in a third embodiment of the present invention.
Figure 9:
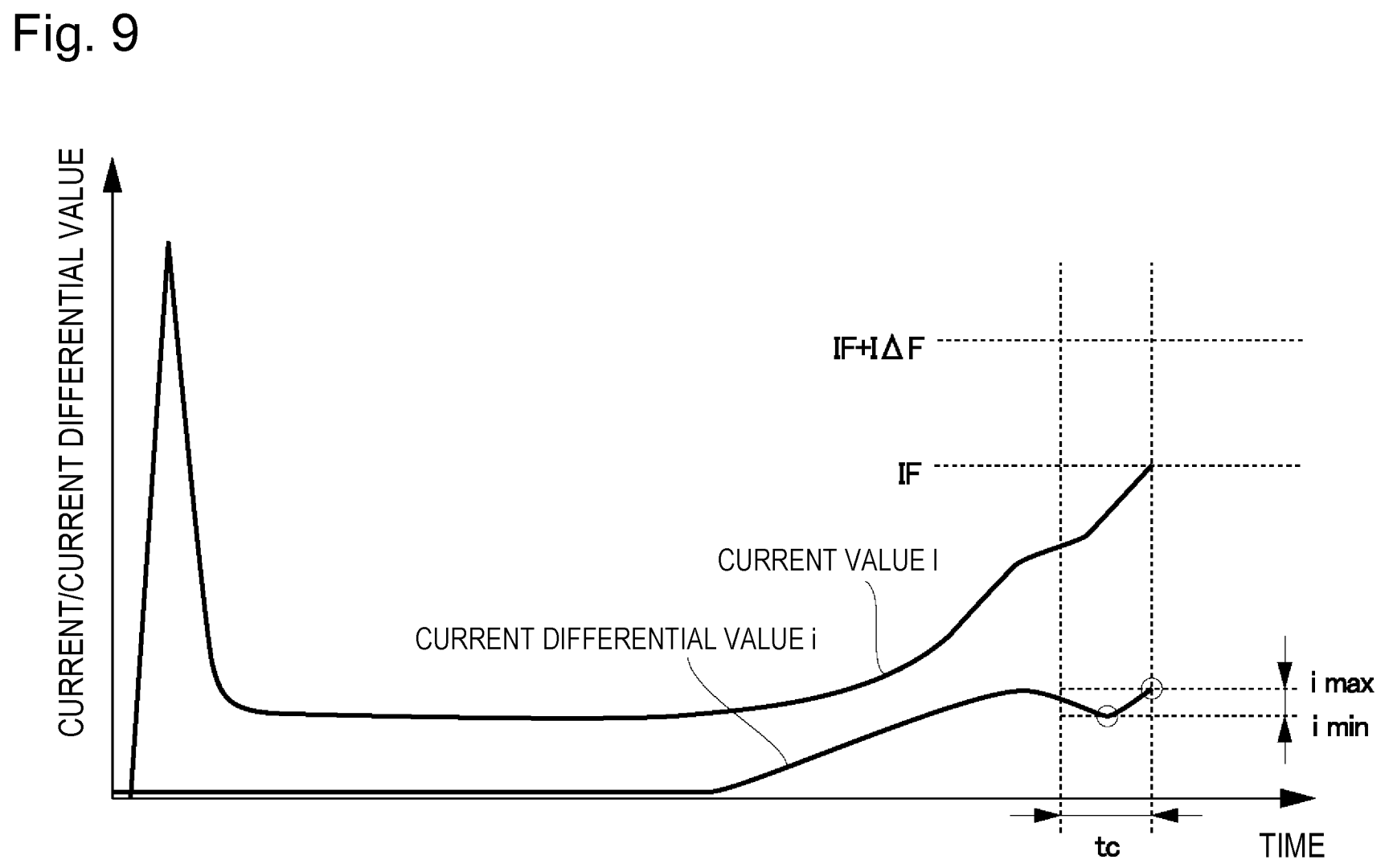

Next, FIG. 8 and FIG. 9 are illustrations of a third embodiment of the present invention. A feature of the third embodiment is that the judgment timing for judging whether or not to stop (whether or not to immediately stop) the electric motor is determined based on a change trend of the current value (current differential value), and when the judgment timing is reached, it is judged to stop the electric motor. In the third embodiment, parts which are the same as those in the first embodiment are designated by the same reference numerals, and description thereof is omitted.

In the third embodiment, in a case in which the motor current I exceeds the application completion current threshold value IF, it is determined that the application completion judgment is established when it is confirmed that the current has not fluctuated within the immediately preceding predetermined time period (that is, application completion is judged, and the electric motor 7A is stopped). As a result, robustness against current fluctuation is ensured, and the variation in the arrival current is suppressed by judging that application completion is established at a control cycle exceeding the application completion current threshold value IF.

That is, in the third embodiment, the parking brake control device 24 determines the timing at which the electric motor 7A is to be stopped based on a current differential value "i" being the change trend of the current value (motor current I) of the electric motor 7A when the electric motor 7A is being driven in the application direction by the application command. In this case, the parking brake control device 24 judges that the electric motor 7A is to be stopped when the change trend, that is, the amount of change in the current differential value "i", of the motor current I in a period "tc" immediately before reaching the application completion current threshold value IF is small (difference between maximum imax and the minimum imin of the current differential value is less than a predetermined value icor), and the electric motor 7A is stopped immediately. Meanwhile, when the amount of change in the current differential value "i" in the period "tc" immediately before reaching the application completion current threshold value IF is large (difference between maximum imax and the minimum imin of the current differential value is equal to or more than the predetermined value icor), it is not judged that the electric motor 7A is to be stopped, and the parking brake control device 24 stops the electric motor 7A at a current threshold value obtained by adding a predetermined additional current amount IΔF to the application completion current threshold value IF.

FIG. 8 is an illustration of control processing in the third embodiment, that is, control processing performed in the arithmetic circuit 25 of the parking brake control device 24. In the third embodiment, the processing program for executing the processing flow illustrated in FIG. 8 is stored in the memory 26 of the parking brake control device 24. Step S1, Step S2, Step S3, and Step S11 of FIG. 8 are the same processing as that of Step S1, Step S2, Step S3, and Step S11 of FIG. 4 in the first embodiment, and therefore description of those steps is omitted here.

In Step S31, which follows "YES" in Step S1 or follows Step S3, it is judged whether or not the mask time of the inrush current has elapsed such that application is not judged to be complete at the inrush current. The processing of Step S31 is the same processing as that of Step S5 of FIG. 4. When Step S31 is judged to be "NO", that is, when it is judged that the inrush current mask time has not elapsed, the processing returns to the start. Meanwhile, when Step S31 is judged to be "YES", that is, when it is judged that the inrush current mask time has elapsed, the processing advances to Step S32. In FIG. 4 of the first embodiment described above, when it is judged that the estimated arrival time t_hat has been calculated in Step S4, the inrush current has settled, and therefore the processing of Step S31 after "YES" in Step S4 is not required. Meanwhile, in the third embodiment, there is no such condition, and therefore the processing of Step S31 is required.

In Step S32, it is judged whether or not the motor current I is equal to or more than the application completion current threshold value IF. The processing of Step S32 is the same as that of Step S10 of FIG. 4. When Step S32 is judged to be "NO", that is, when it is judged that the motor current I is not equal to or more than the application completion current threshold value IF, the processing returns to the start. When Step S32 is judged to be "YES", that is, when it is judged that the motor current I is equal to or more than the application completion current threshold value IF, the processing advances to Step S33.

In Step S33, it is judged whether or not the difference between the maximum imax and the minimum imin of the current differential value during the immediately preceding predetermined time "tc" is less than the predetermined value icor. When Step S33 is judged to be "YES", that is, when it is judged that the difference between the maximum imax and the minimum imin of the current differential value during the immediately preceding predetermined time "tc" is less than the predetermined value icor, the processing advances to Step S11. Meanwhile, when Step S33 is judged to be "NO", that is, when it is judged that the difference between the maximum imax and the minimum imin of the current differential value during the immediately preceding predetermined time "tc" is not less than the predetermined value icor, the processing advances to Step S34. In Step S34, as a second application completion judgment, it is judged whether or not the motor current I is equal to or more than the sum of the application completion current threshold value IF and the additional current amount IΔF. When Step S34 is judged to be "NO", that is, when it is judged that the motor current I is not equal to or more than the sum of the application completion current threshold value IF and the additional current amount IΔF, the processing returns to the start. Meanwhile, when Step S34 is judged to be "YES", that is, when it is judged that the motor current I is equal to or more than the sum of the application completion current threshold value IF and the additional current amount IΔF, the processing advances to Step S11. The additional current amount IΔF is an additional current for guaranteeing thrust by avoiding the application completion judgment not being established and power continuing to be supplied when the current continues to fluctuate, and can be set to 3 A, for example.

In FIG. 9, there is shown an example of current change over time at the time of application in the third embodiment. When an application command is output from the parking brake switch 23 or based on the application judgment logic of the parking brake, for example, the parking brake control device 24 starts driving the electric motor 7A (Step S3). When the inrush current settles immediately after the electric motor 7A starts to be driven and the current value becomes equal to or more than the application completion current threshold value IF (Step S32), it is judged whether or not the "difference between the maximum imax and the minimum imin of the current differential value" during the immediately preceding predetermined time "tc" is less than the predetermined value icor (Step S33). When it is judged that the "difference between the maximum imax and the minimum imin of the current differential value" is less than the predetermined value icor, the parking brake control device 24 judges that the electric motor 7A is to be stopped, and stops the electric motor 7A (Step S11). Meanwhile, when it is judged that the "difference between the maximum imax and the minimum imin of the current differential value" is equal to or more than the predetermined value icor, the parking brake control device 24 judges whether or not the motor current I is equal to or more than "the sum of the application completion current threshold value IF and the additional current amount IΔF" (Step S34). In this case, when it is judged that the motor current I is equal to or more than "the sum of the application completion current threshold value IF and the additional current amount IΔF," the parking brake control device 24 judges that the electric motor 7A is to be stopped, and stops the electric motor 7A (Step S11). As a result, it is possible to prevent the braking force of the parking brake (thrust based on the drive of the electric motor 7A) from becoming excessive or too small.

In the third embodiment, the judgment timing for judging whether or not to stop the electric motor 7A (whether or not to immediately stop because the current value is equal to or more than the application completion current threshold value IF) is determined in Step S31, Step S32, Step S33, and Step S34 as described above, and it is judged that the electric motor 7A is to be stopped at the determined judgment timing (the electric motor 7A is stopped). There is no particular difference in the basic action of the third embodiment from that of the first embodiment and the second embodiment described above. That is, like in the first embodiment and the second embodiment, in the third embodiment as well, it is possible to suppress variation in the arrival current (that is, thrust) while robustness against current fluctuation is ensured.

Figure 10:
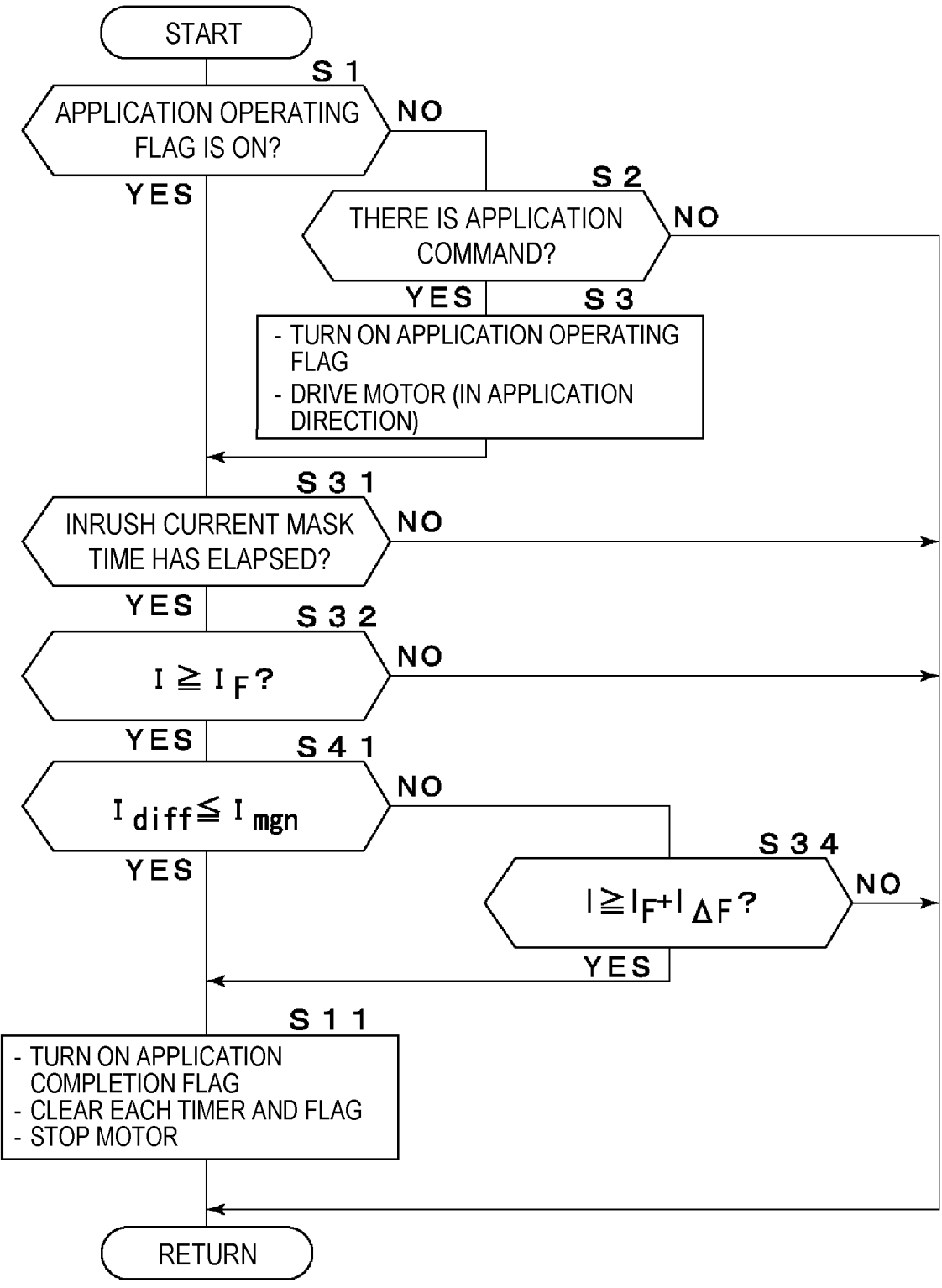
FIG. 10 is a flowchart for illustrating control processing of a parking brake control device in a fourth embodiment of the present invention.
Figure 11:
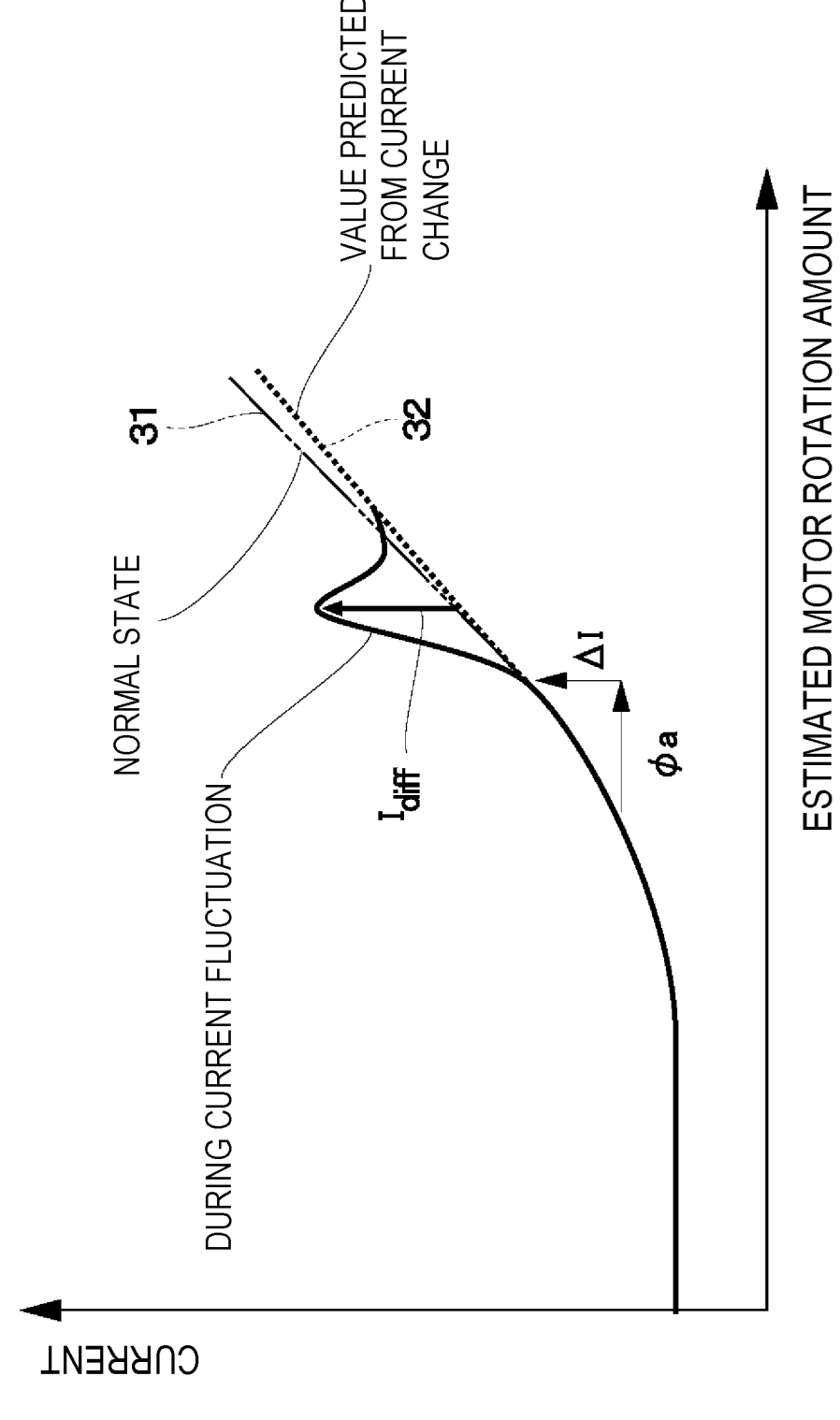
FIG. 11 is a characteristic curve diagram for showing an example of a relationship between an estimated motor rotation amount and a current in the fourth embodiment.

Next, FIG. 10 and FIG. 11 are illustrations of a fourth embodiment of the present invention. A feature of the fourth embodiment is that the judgment timing for judging whether or not the electric motor has reached the rotational position (whether or not to immediately stop the electric motor) is determined based on a change trend of the current, and when the judgment timing is reached, it is judged to stop the electric motor. In the fourth embodiment, parts which are the same as those in the third embodiment are designated by the same reference numerals, and description thereof is omitted.

In the fourth embodiment, when the motor current I exceeds the application completion current threshold value IF, it is determined that the application completion judgment is established when it is confirmed that the current value for the motor rotation amount has not fluctuated (that is, application completion is judged, and the electric motor 7A is stopped). As a result, robustness against current fluctuation is ensured, and the variation in the arrival current is suppressed by judging that application completion is established at a control cycle exceeding the application completion current threshold value IF. In this case, current fluctuation is judged based on the current value for the motor rotation amount, and therefore the judgment can be performed by canceling the influence of changes in the motor rotation speed due to the fluctuations in the power supply voltage.

The motor rotation amount can be estimated based on the current I and voltage V of the electric motor 7A. In this case, the motor rotation amount can be calculated by integrating the rotation speed of the electric motor 7A, that is, the motor rotation speed $\omega$. The motor rotation speed $\omega$ can be obtained from the following Formula (3), where D and R represent coefficients, V represents the voltage between the motor terminals, and I represents the current value (motor current). In this case, the estimation accuracy can be improved by using the voltage between the motor terminals in place of the power supply voltage. Further, the motor rotation amount can be measured by arranging a rotation angle sensor. Moreover, the motor rotation amount can be converted from the linear motion sensor value.

$$\omega = D(V - RI) \qquad \text{[Formula 3]}$$

In the fourth embodiment, the parking brake control device 24 determines a judgment timing (time) for judging, when there is a request to hold the brake pads 6C (application command), whether or not the rotational position of the electric motor 7A at which holding of the brake pads 6C is complete has arrived. In this case, the parking brake control device 24 determines (calculates) the judgment timing for judging whether or not the rotational position of the electric motor 7A at which holding of the brake pads 6C is complete has arrived based on a change trend (change amount or slope) of the current value (motor current I) of the electric motor 7A. When the determined judgment timing is reached, the parking brake control device 24 judges that the holding of the brake pads 6C is complete.

Specifically, the parking brake control device 24 determines, when the electric motor 7A is being driven in the application direction based on an application command, the timing of stopping the electric motor 7A based on the change trend of the current value (motor current I) of the electric motor 7A, that is, a difference Idiff between a predicted value of the motor rotation amount predicted from the current value and the motor rotation amount in a normal state. In this case, the parking brake control device 24 judges that the electric motor is to be stopped when the difference Idiff between a predicted value estimated from the current change from an immediately preceding predetermined motor rotation amount $\varphi$a when the application completion current threshold value IF is reached and the normal state is small (the difference Idiff is equal to or less than the predetermined threshold value Imgn), and immediately stops the electric motor 7A. Meanwhile, when the difference Idiff between the predicted value estimated from the current change from the immediately preceding predetermined motor rotation amount pa when the application completion current threshold value IF is reached and the normal state is large (the difference Idiff is more than the predetermined threshold value Imgn), it is not judged that the electric motor 7A is to be stopped, and the parking brake control device 24 stops the electric motor 7A at a current threshold value obtained by adding the predetermined additional current amount IΔF to the application completion current threshold value IF.

FIG. 10 is an illustration of control processing in the fourth embodiment, that is, control processing performed in the arithmetic circuit 25 of the parking brake control device 24. In the fourth embodiment, the processing program for executing the processing flow illustrated in FIG. 10 is stored in the memory 26 of the parking brake control device 24. Step S1, Step S2, Step S3, and Step S11 of FIG. 10 are the same processing as that of Step S1, Step S2, Step S3, and Step S11 of FIG. 4 of the first embodiment, and Step S31, Step S32, and Step S34 of FIG. 10 are the same processing as that of Step S31, Step S32, and Step S34 of FIG. 8 of the third embodiment, and therefore description of those steps is omitted here.

In Step S41, it is judged whether or not the difference Idiff between the predicted value estimated from the current change from the immediately preceding predetermined motor rotation amount pa and the normal state is equal to or less than a predetermined threshold value Imgn. When Step S41 is judged to be "YES", that is, when it is judged that the difference Idiff is equal to or less than the predetermined threshold value Imgn, the processing advances to Step S11. Meanwhile, when Step S41 is judged to be "NO", that is, when it is judged that the difference Idiff is equal to or less than the predetermined threshold value Imgn, the processing advances to Step S11. FIG. 11 is a characteristic curve diagram in which that the current value is plotted against the estimated motor rotation amount at the time of application. In the normal state, the current value increases linearly like the alternate long and short dash line 31, and therefore the difference Idiff from the predicted value (broken line 32) estimated from the current change from the immediately preceding predetermined motor rotation amount pa becomes close to zero. However, the current value is not linear during current fluctuation, and the difference Idiff from the predicted value increases. The motor rotation amount is a displacement which is proportional to the thrust, and therefore when the difference Idiff from the predicted value is large, the thrust for the same current value is low. Therefore, when application is judged to be complete under a state in which the difference Idiff from the predicted value is large, the thrust is less than a target value. In order to avoid this state, in Step S41, it is judged whether or not the difference Idiff between the predicted value estimated from the current change from the immediately preceding predetermined motor rotation amount φa and the normal state is equal to or less than the predetermined threshold value Imgn. Then, when the difference Idiff from the predicted value is larger than the predetermined threshold value Imgn, the processing advances to Step S34. The difference Idiff from the predicted value at the time of application completion correlates with the difference between the thrust estimated from the motor current value I and the actual thrust. Therefore, the threshold value Imgn is set so that the decrease in thrust due to the current fluctuation is within the margin of safety for the minimum thrust required to guarantee that the vehicle is held and the thrust that is the target at the time of application.

In the fourth embodiment, the judgment timing for judging whether or not to stop the electric motor 7A (whether or not to immediately stop because the current value is equal to or more than the application completion current threshold value IF) is determined in Step S41 as described above, and it is judged that the electric motor 7A is to be stopped at the determined judgment timing (the electric motor 7A is stopped). There is no particular difference in the basic action of the fourth embodiment from that of the third embodiment described above. That is, like in the first embodiment to the third embodiment, in the fourth embodiment as well, it is possible to suppress variation in the arrival current (that is, thrust) while robustness against current fluctuation is ensured. In this case, in the fourth embodiment, the motor rotation amount is used for the judgment of whether or not to stop the electric motor 7A. That is, the judgment of whether or not to stop the electric motor 7A is performed based on the estimated motor rotation amount (the difference Idiff between the predicted value estimated from the current change from the immediately preceding predetermined motor rotation amount pa and the normal state). Like in the first embodiment to the third embodiment, in the fourth embodiment as well, it is possible to suppress both erroneous detection of the application completion and variation in the thrust at the time of the application completion.

In the first to fourth embodiments, as examples, there are described cases in which whether or not the electric motor is to be stopped is judged when application is complete. That is, in the first to fourth embodiments, as examples, there are described cases in which the application completion flag is turned ON in Step S11 of FIG. 4, FIG. 6, FIG. 8, and FIG. 10. However, the present invention is not limited to this. For example, the application completion flag may not be turned ON in Step S11, and the electric motor may be energized again later. That is, the application completion flag may be used to judge whether or not the electric motor is to be stopped in the case of a configuration in which energization is temporarily stopped during application (the electric motor is temporarily stopped and then driven again during application). Further, the judgment of whether or not the electric motor is to be stopped in the first to fourth embodiments may be used in the application from a state in which the thrust has been generated. In those cases, even when the thrust is generated stepwise during application or when the thrust increase is temporarily stopped during application, the electric motor can be stopped at the proper timing, and the arrival current during a current fluctuation, that is, the excess or deficiency of thrust, can be suppressed. Examples of situations in which thrust is generated stepwise or an increase in thrust is temporarily stopped include cases of avoiding wheel lock while operating the parking brake during travel, and cases of preventing sudden wheel lock during a braking force inspection with a roller dynamo.

In each embodiment, as an example, there has been described a case in which the rear-wheel disc brakes 6 are hydraulic disc brakes having an electric parking brake function and the front-wheel disc brakes 5 are hydraulic disc brakes not having an electric parking brake function. However, the present invention is not limited to this. For example, the rear-wheel disc brakes 6 may be hydraulic disc brakes not having an electric parking brake function and the front-wheel disc brakes 5 may be hydraulic disc brakes having an electric parking brake function. Further, the front-wheel disc brakes 5 and the rear-wheel disc brakes 6 may both be hydraulic disc brakes having an electric parking brake function. In short, the brakes of at least a pair of left and right wheels of the wheels of the vehicle can be configured as the electric parking brakes.

In each embodiment, as the electric brake mechanism, hydraulic disc brakes 6 having an electric parking brake have been described as an example. However, the brake mechanism is not limited to a disc brake type, and may be configured as a drum brake type brake mechanism. Further, various types of electric parking brake configurations can be adopted, for example, a drum-in disc brake having a drum-type electric parking brake in the disc brake, and a configuration in which the parking brake is held by pulling a cable by an electric motor. Moreover, it is to be understood that each embodiment is exemplary and the configurations described in different embodiments can be partially replaced or combined.

As the electric brake device based on the embodiments described above, for example, the aspects described below can be considered.

As a first aspect, there is provided an electric brake device including: an electric brake mechanism in which a piston propelled by a rotation-linear motion mechanism driven by an electric motor is configured to press a braking member against a braked member, and to hold the braking member at a pressing position by stopping the electric motor; and a control unit configured to control the electric motor, wherein the control unit is configured to determine, when a request to hold the braking member is made, a judgment timing for judging whether to stop the electric motor based on a change trend of a current value of the electric motor, and to judge, when the judgment timing is reached, whether to stop the electric motor.

According to the first aspect, the judgment timing for judging whether or not to stop the electric motor is determined based on the change trend of the current value of the electric motor. Therefore, it is possible to determine the judgment timing in consideration of current fluctuations. This enables the electric motor to be stopped at a proper timing, and the arrival current during a current fluctuation, that is, the excess or deficiency of thrust, to be suppressed. As a result, variation in thrust can be reduced and excessive thrust can be suppressed, and therefore responsiveness can be improved, operating noise can be reduced, the electric brake mechanism (caliper) can be made smaller and lighter, and cost can be reduced.

As a second aspect, in the first aspect, the control unit is configured to judge, when the judgment timing is reached, the electric motor is allowed to be stopped when the current value of the electric motor is equal to or more than a predetermined value. According to the second aspect, the electric motor can be stopped under the state in which the current value is equal to or more than the predetermined value, and therefore insufficient thrust can be suppressed.

As a third aspect, in the first aspect or the second aspect, the control unit is configured to determine, when the current value is increased after a predetermined period of time has elapsed since start of driving of the electric motor, the judgment timing for judging whether to stop the electric motor based on the change trend of the current value of the electric motor. According to the third aspect, the judgment timing can be determined while avoiding the inrush current when the electric motor starts to be driven.

As a fourth aspect, there is provided an electric brake device including: an electric brake mechanism in which a piston propelled by a rotation-linear motion mechanism driven by an electric motor is configured to press a braking member against a braked member, and to hold the braking member at a pressing position by stopping the electric motor; and a control unit configured to control the electric motor, wherein the control unit is configured to determine, when a request to hold the braking member is made, a judgment timing for judging whether a rotational position of the electric motor has arrived at a position at which holding of the braking member is complete based on a change trend of a current value of the electric motor, and to judge, when the judgment timing is reached, whether the holding of the braking member is complete.

According to this fourth aspect, the judgment timing for judging whether or not the rotational position of the electric motor at which holding of the braking member is complete is reached can be determined based on the change trend of the current value of the electric motor. Therefore, it is possible to determine the judgment timing in consideration of current fluctuations. This enables the electric motor to be stopped at a proper timing, and the arrival current during a current fluctuation, that is, the excess or deficiency of thrust, to be suppressed. As a result, variation in thrust can be reduced and excessive thrust can be suppressed, and therefore responsiveness can be improved, operating noise can be reduced, the electric brake mechanism (caliper) can be made smaller and lighter, and cost can be reduced.

Note that, the present invention is not limited to the embodiments described above, and includes further various modification examples. For example, in the embodiments described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2018-242708 filed on Dec. 26, 2018. All disclosed contents including Specification, Scope of Claims, Drawings, and Abstract of Japanese Patent Application No. 2018-242708 filed on Dec. 26, 2018 are incorporated herein by reference in their entirety.

REFERENCE SIGNS LIST

4 disc rotor (braked member), 6 rear-wheel disc brake (electric brake mechanism), 6C brake pad (braking member), 6D piston, 7A electric motor, 8 rotation-linear motion mechanism, 24 parking brake control device (control unit)

The invention claimed is:

1. An electric brake device, comprising:
an electric brake mechanism in which a piston propelled by a rotation-linear motion mechanism driven by an electric motor is configured to press a braking member against a braked member, and to hold the braking member at a pressing position by stopping the electric motor; and
a control unit configured to control the electric motor,
wherein the control unit is configured to, when a request to hold the braking member is made,
calculate a current change of a current value of the electric motor over a predetermined first period of time,
calculate a second period of time based on the calculated current change of the current value over the predetermined first period of time, the second period of time beginning after an end of the predetermined first period of time and ending at a judgment timing at which the holding of the braking member is complete, for judging whether to stop the electric motor, and
to judge, only after the second period of time has elapsed, whether to stop the electric motor.

2. The electric brake device according to claim 1, wherein the control unit is configured to judge, when the judgment timing is reached, that the electric motor is allowed to be stopped when the current value of the electric motor is equal to or more than a predetermined value.

3. The electric brake device according to claim 1, wherein the control unit is configured to determine, when the current value is increased after a predetermined third period of time has elapsed since a start of driving of the electric motor, the judgment timing for judging whether to stop the electric motor based on the calculated current change of the current value over the predetermined first period of time.

4. An electric brake device, comprising:
an electric brake mechanism in which a piston propelled by a rotation-linear motion mechanism driven by an electric motor is configured to press a braking member against a braked member, and to hold the braking member at a pressing position by stopping the electric motor; and
a control unit configured to control the electric motor,
wherein the control unit is configured
to determine, when a request to hold the braking member is made, a judgment threshold value for judging whether a rotational position of the electric motor has arrived at a position at which holding of the braking member is complete, the judgment threshold value being determined based on a current change over time of a current value of the electric motor and based on a difference between a motor rotation amount in a normal state and a predicted value of a motor rotation amount, the normal state being a state in which the current value of the electric motor increases linearly, and
to judge, when the judgment threshold value is reached, whether the holding of the braking member is complete.

5. The electric brake device according to claim 2, wherein the control unit is configured to determine, when the current value is increased after a predetermined third period of time has elapsed since a start of driving of the electric motor, the judgment timing for judging whether to stop the electric motor based on the calculated current change of the current value over the predetermined first period of time.

6. The electric brake device according to claim 4, wherein the predicted value of the motor rotation amount is a motor rotation amount estimated from a current change from an immediately preceding predetermined motor rotation amount when the current value of the electric motor reaches a predetermined value.

* * * * *